United States Patent [19]
Gal et al.

[11] Patent Number: 5,781,257
[45] Date of Patent: Jul. 14, 1998

[54] FLAT PANEL DISPLAY

[75] Inventors: George Gal, Palo Alto; Bruce J. Herman, Mountainview, both of Calif.

[73] Assignee: Lockheed Martin Missiles & Space Co., Sunnyvale, Calif.

[21] Appl. No.: 406,720

[22] Filed: Mar. 20, 1995

Related U.S. Application Data

[63] Continuation-in-part of Ser. No. 380,109, Jan. 30, 1995, Pat. No. 5,600,486.

[51] Int. Cl.$^6$ ................................................ G02F 1/1335
[52] U.S. Cl. ............................ 349/57; 349/62; 349/95
[58] Field of Search .............................. 359/40, 49, 68, 359/619; 349/57, 62, 95

[56] References Cited

U.S. PATENT DOCUMENTS

| | | | |
|---|---|---|---|
| 3,797,914 | 3/1974 | Aiken | 359/49 |
| 4,686,519 | 8/1987 | Yoshida et al. | 359/40 |
| 4,690,511 | 9/1987 | Watanabe | 359/80 |
| 4,798,448 | 1/1989 | van Raalte | 359/73 |
| 4,861,140 | 8/1989 | Lucitte et al. | 350/320 |
| 5,013,133 | 5/1991 | Buralli et al. | 350/162.11 |
| 5,098,184 | 3/1992 | Vander Brandt | 353/102 |
| 5,139,609 | 8/1992 | Fields et al. | 156/643 |
| 5,159,478 | 10/1992 | Akiyama et al. | 349/68 |
| 5,161,042 | 11/1992 | Hamada | 359/49 |
| 5,161,059 | 11/1992 | Swanson et al. | 359/565 |
| 5,270,859 | 12/1993 | Wirth et al. | 359/622 |
| 5,548,349 | 8/1996 | Mizuguchi et al. | 359/49 |

FOREIGN PATENT DOCUMENTS

| | | | |
|---|---|---|---|
| 61-230117 | 10/1986 | Japan | 359/49 |
| 62-086330 | 4/1987 | Japan | 359/69 |
| 62-150317 | 7/1987 | Japan | 359/49 |
| 62-299943 | 12/1987 | Japan | 359/49 |
| 3-191348 | 8/1991 | Japan. | |
| 2179472 | 3/1987 | United Kingdom. | |
| WO 9400781 | 1/1994 | WIPO. | |

OTHER PUBLICATIONS

H. Dammann, "Color Separation Gratings", Aug., 1978, *Applied Engineering*, vol. 17, No. 15.

Wada, Osamu, "Ion-Beam Etching of InP and Its Application to the Fabrication of High Radiance InGaAsP/InP Light Emitting Diodes", Oct., 1984, J. Electrochem. Soc.: *Solid-State Science and Technology*, vol. 131, 10.

George Gal, "Micro-optics Technology Development For Advanced Sensors" from proceedings of a conference held Jul. 12-13, 1993, San Diego, California and reprinted in *Critical Reviews of Optical Science and Technology*, vol. CR49, copyright 1994 by the Society of Photo-optical Instrumentation Engineers.

Michael W. Farn, Margaret B. Stern, Wilfrid B. Veldkamp, and Shirley S. Medeiros, "Color Separation by Use of Binary Optics", Aug. 1, 1993, *Optics Letters*, vol. 18, No. 15.

(List continued on next page.)

*Primary Examiner*—Anita Pellman Gross
*Attorney, Agent, or Firm*—Feix & Feix

[57] ABSTRACT

A flat panel display incorporates an array of color separation microlenses. Each color separation microlens in the array is a single, micro-optical element which disperses color by orders to distinct color spots and focuses these color spots to related liquid crystal sub-pixels located in a common plane. Substantially all of the areas of the color spots fall directly and only on the liquid crystal sub-pixels. Little, if any, light energy is lost by falling outside areas occupied by the individual liquid crystal sub-pixels. Because the color separation microlenses provide the color separation, no color filter is required in the flat panel display. Eliminating the color filters eliminates light losses which are incurred when transmitting light through a color filter. The flat panel display makes more efficient use of light transmitted through the components of the display than was possible with prior art flat panel displays.

8 Claims, 22 Drawing Sheets

OTHER PUBLICATIONS

George Gal, B. Herman, W. Anderson, R. Whitney, and H. Morrow, "Micro–optics Technology and Sensor Systems Applications", Aug., 1993, *NASA Conference Publication 3227* of Binary Optics Conference, Huntsville, Alabama (1993).

B. Herman and G. Gal, "Theory of Dispersive Microlenses", Aug., 1993, *NASA Conference Publication 3227* of Binary Optics Conference, Huntsville, Alabama (1993).

W. W. Anderson, J. Marley, and G. Gal, "Fabrication of Micro–Optical Devices", Aug., 1993, *NASA Conference Publication 3227* of Binary Optics Conference, Huntsville, Alabama (1993)

D. Shough, B. Herman, and G. Gal, "Measurements of Microlens Performance", Aug., 1993, *NASA Conference Publication 3227* of Binary Optics Conference, Huntsville, Alabama (1993).

Michael W. Farn, Robert E. Knowlden, Margaret B. Stern, and Wilfrid B. Veldkamp, "Color Separation Gratings", Conference on Binary Optics, 1993.

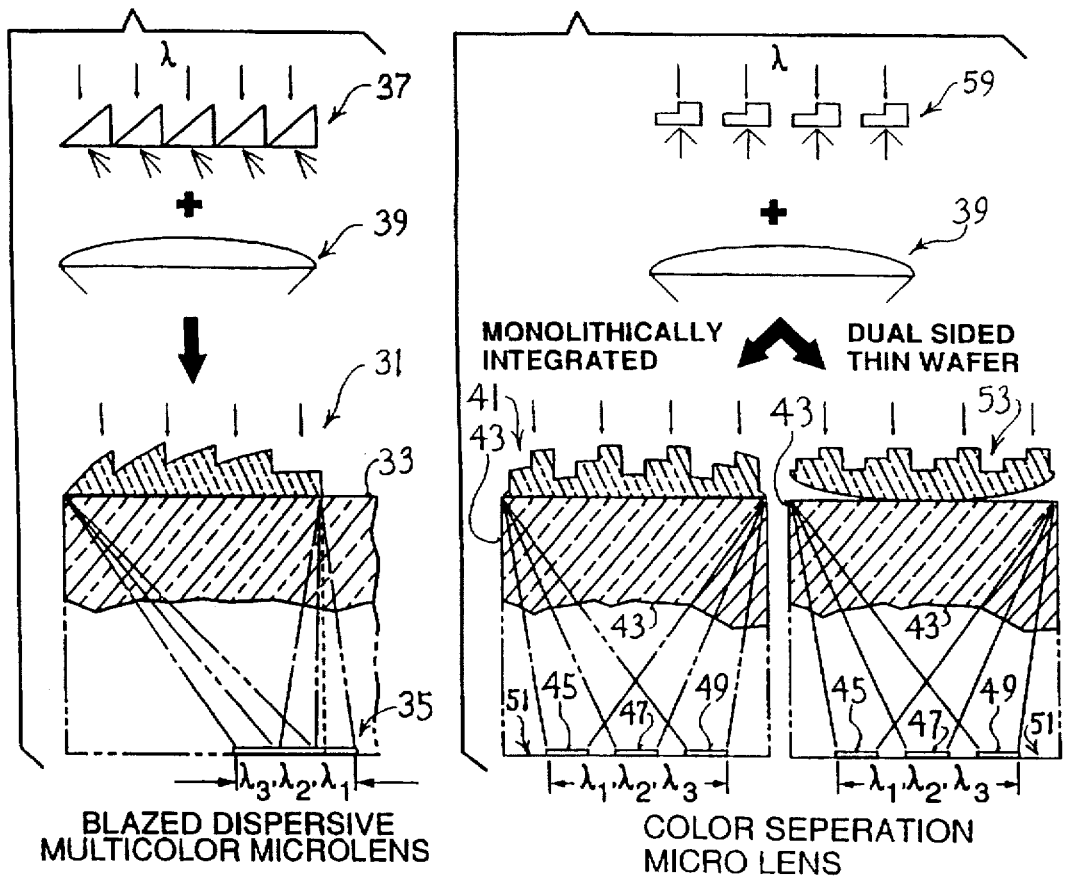

FIG_4
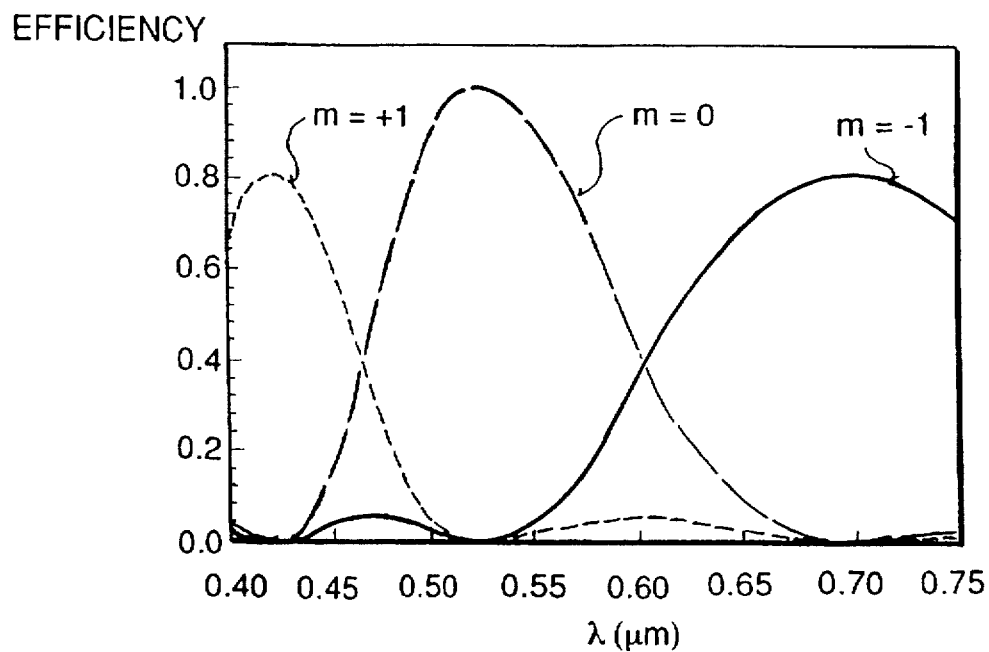
FIG_5
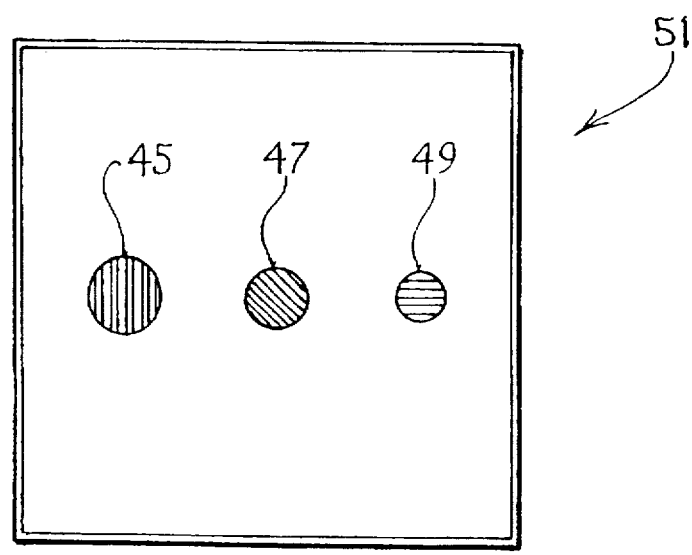

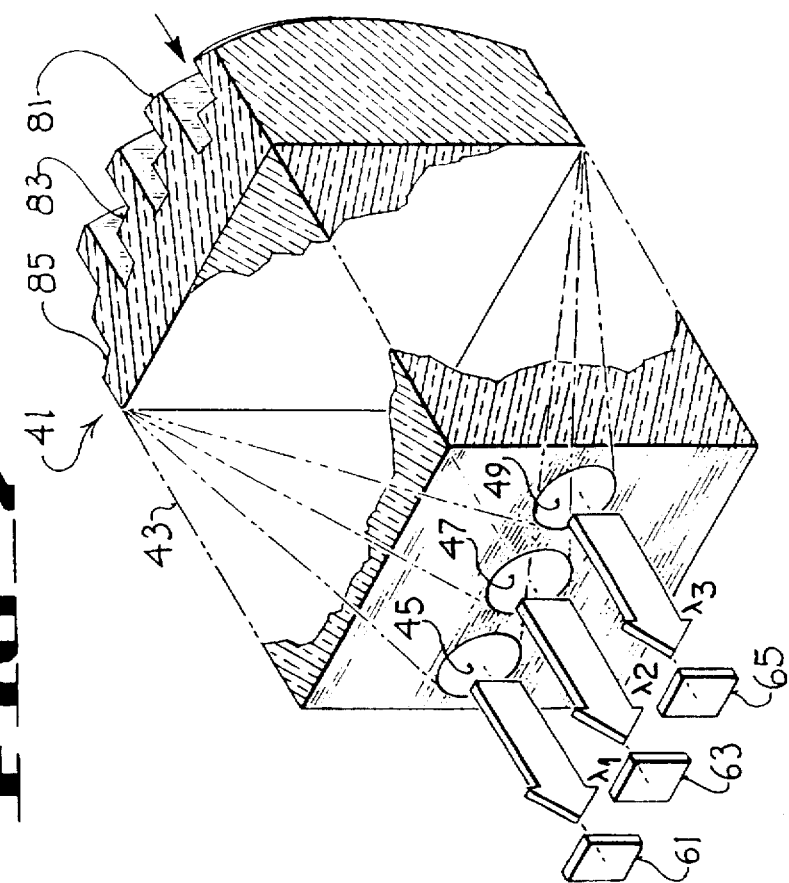
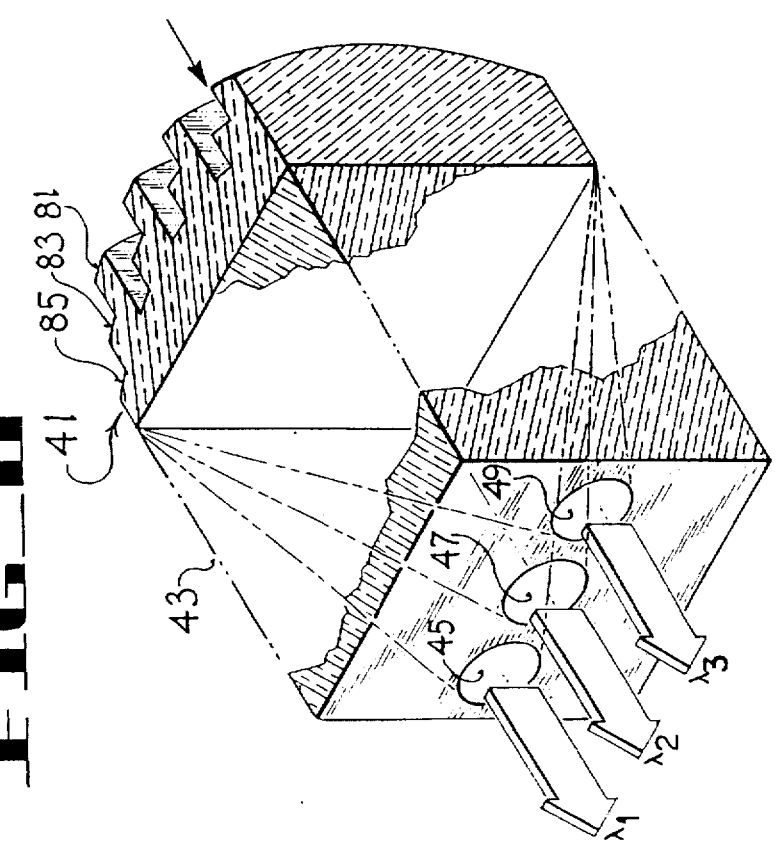

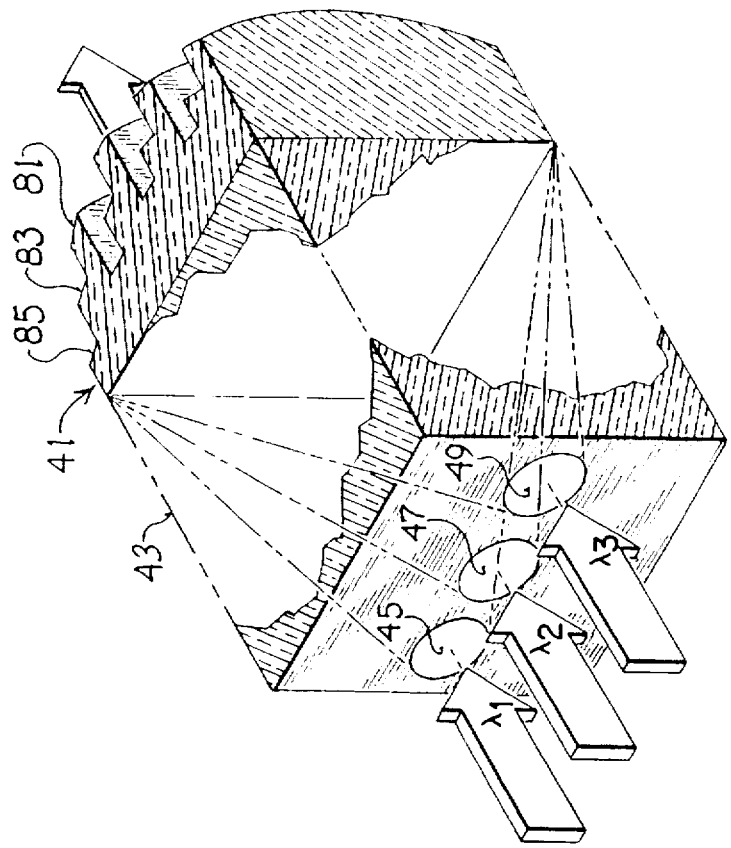
FIG_8A
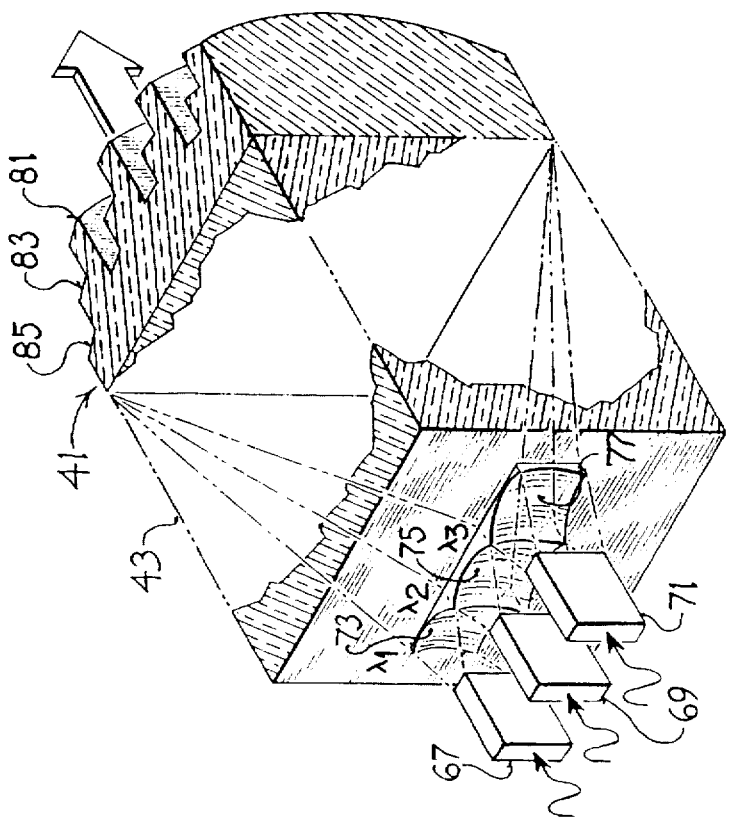
FIG_8

FIG_9
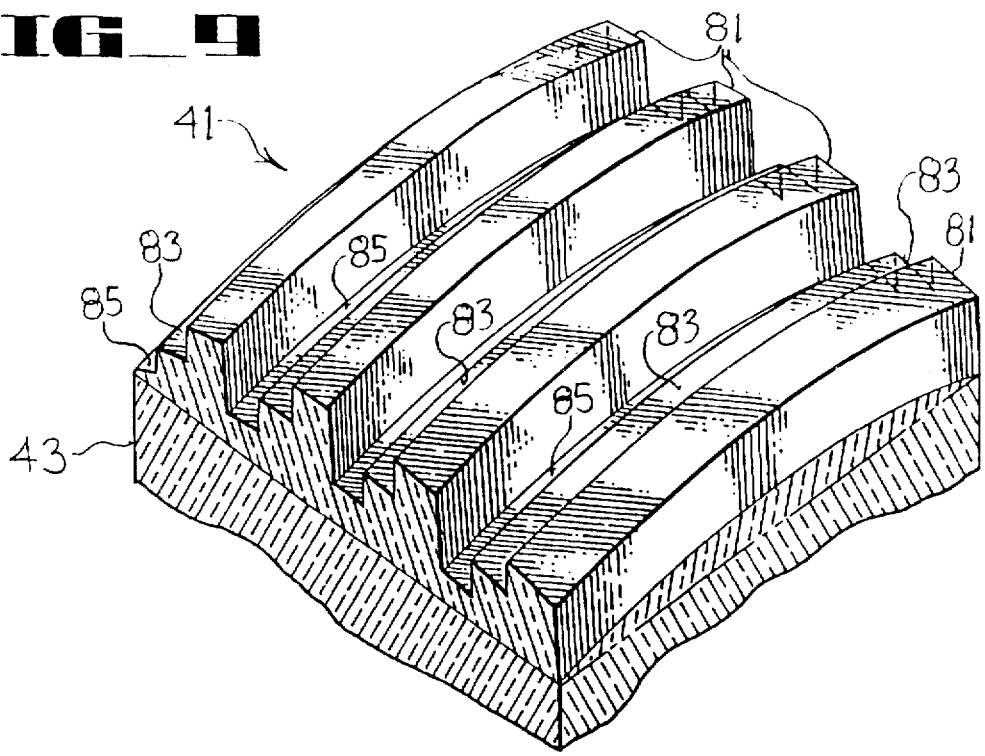
FIG_10
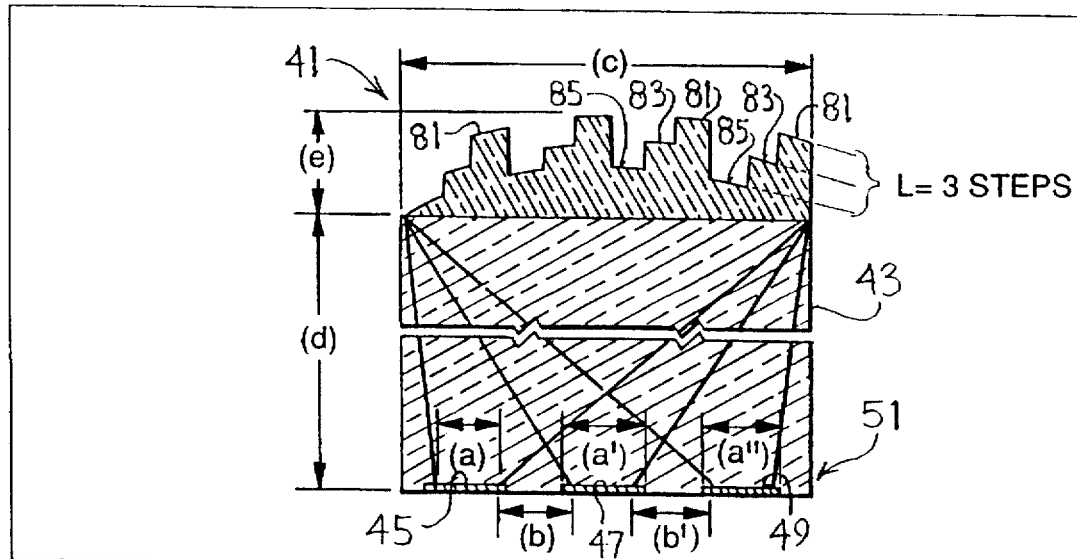
| APPLICATION | SENSOR | FLAT PANEL DISPLAY |
|---|---|---|
| WAVEBAND | 400 nm < λ < 750 nm | 400 nm < λ < 750 nm |
| SPOT SIZES (a,a',a") | ~ 6 μm | ~ 6 μm |
| SPOT SEPARATIONS (b,b') | ~ 12 μm | ~ 12 μm |
| PIXEL SIZE (c) | 50 μm | |
| SUBSTRATE THICKNESS (d) | 400 μm | |
| MAXIMUM ETCHING DEPTH (e) | 8.8 μm | 8.8 μm |

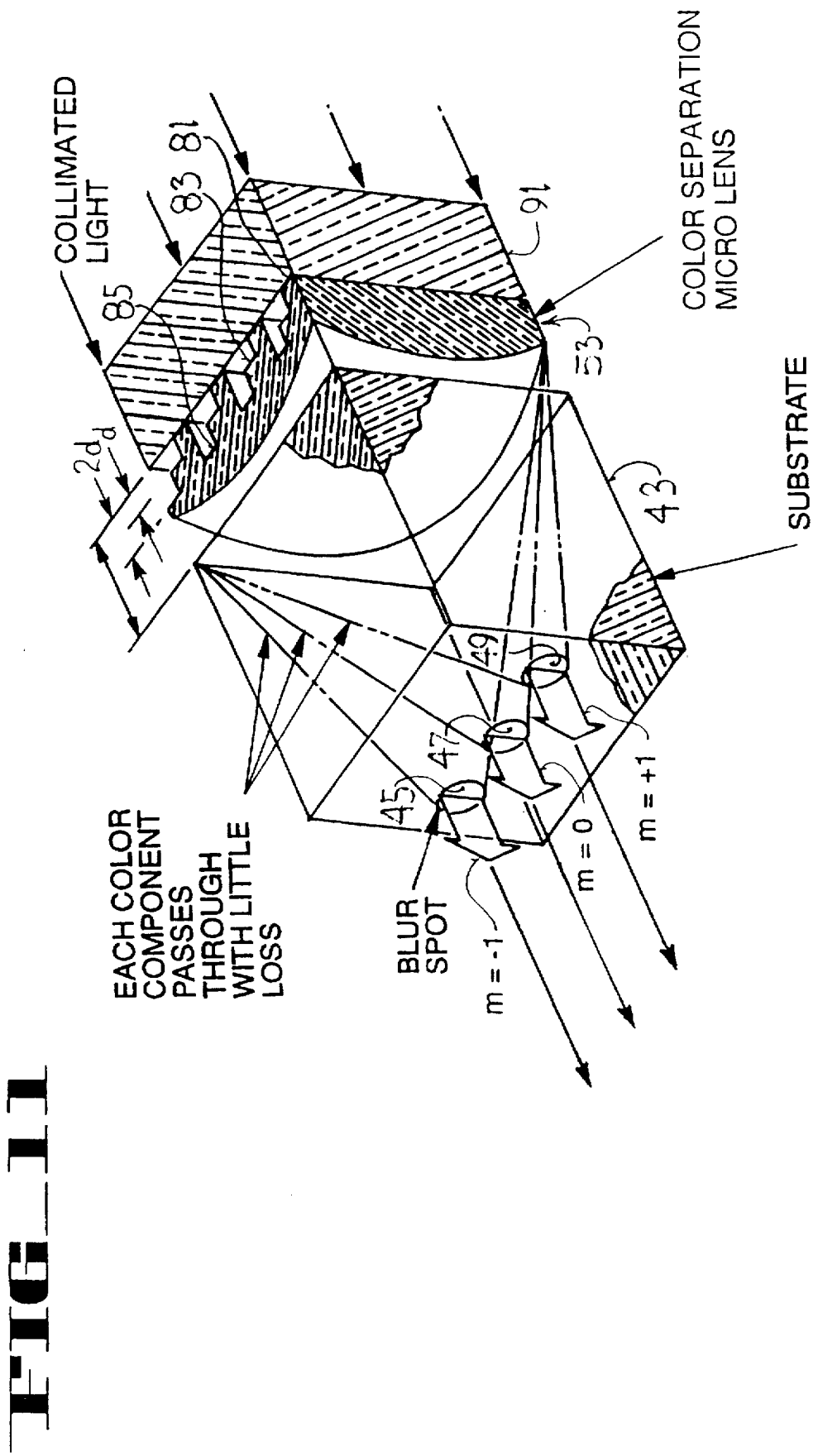
FIG_11

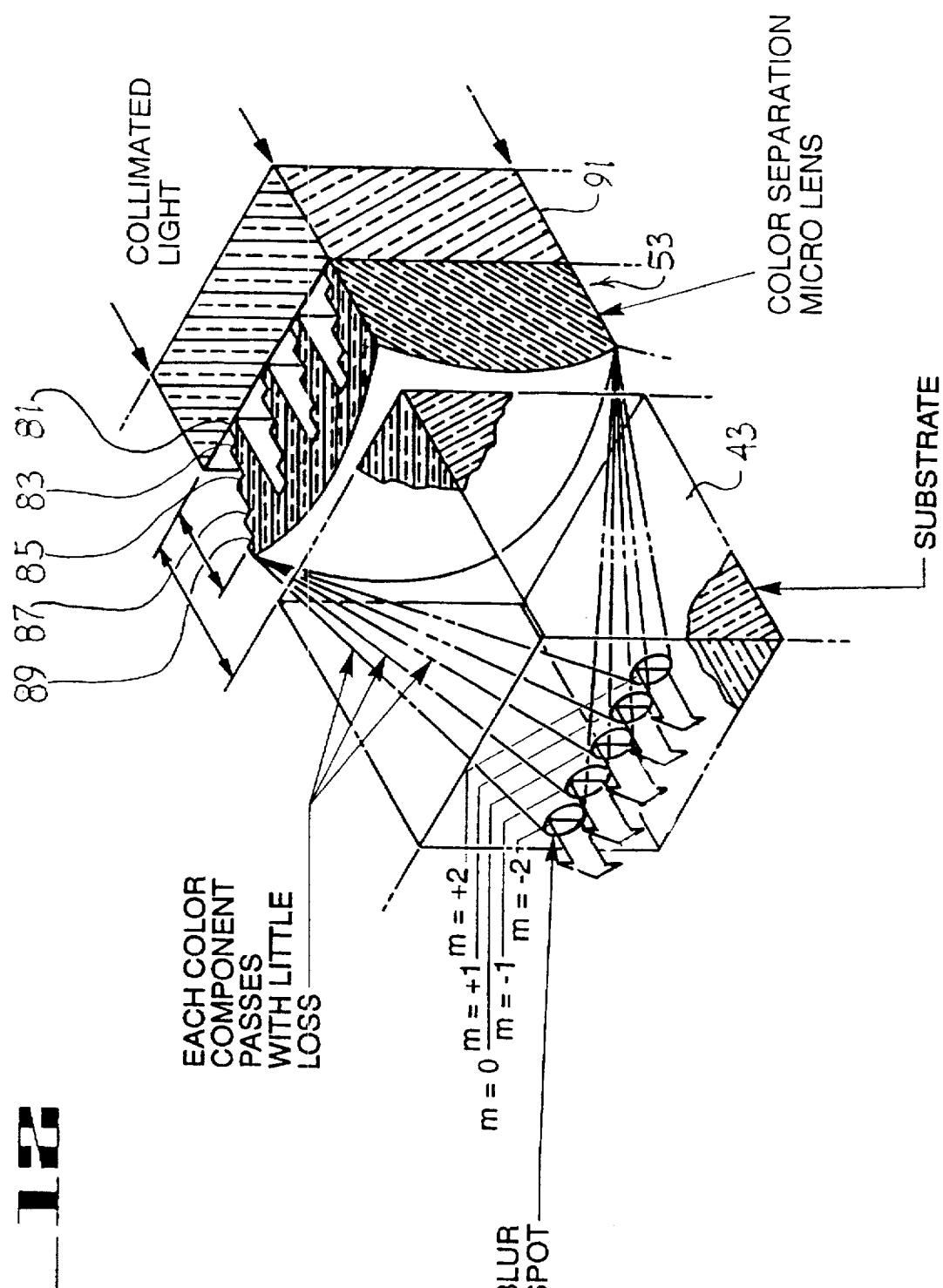
FIG_12

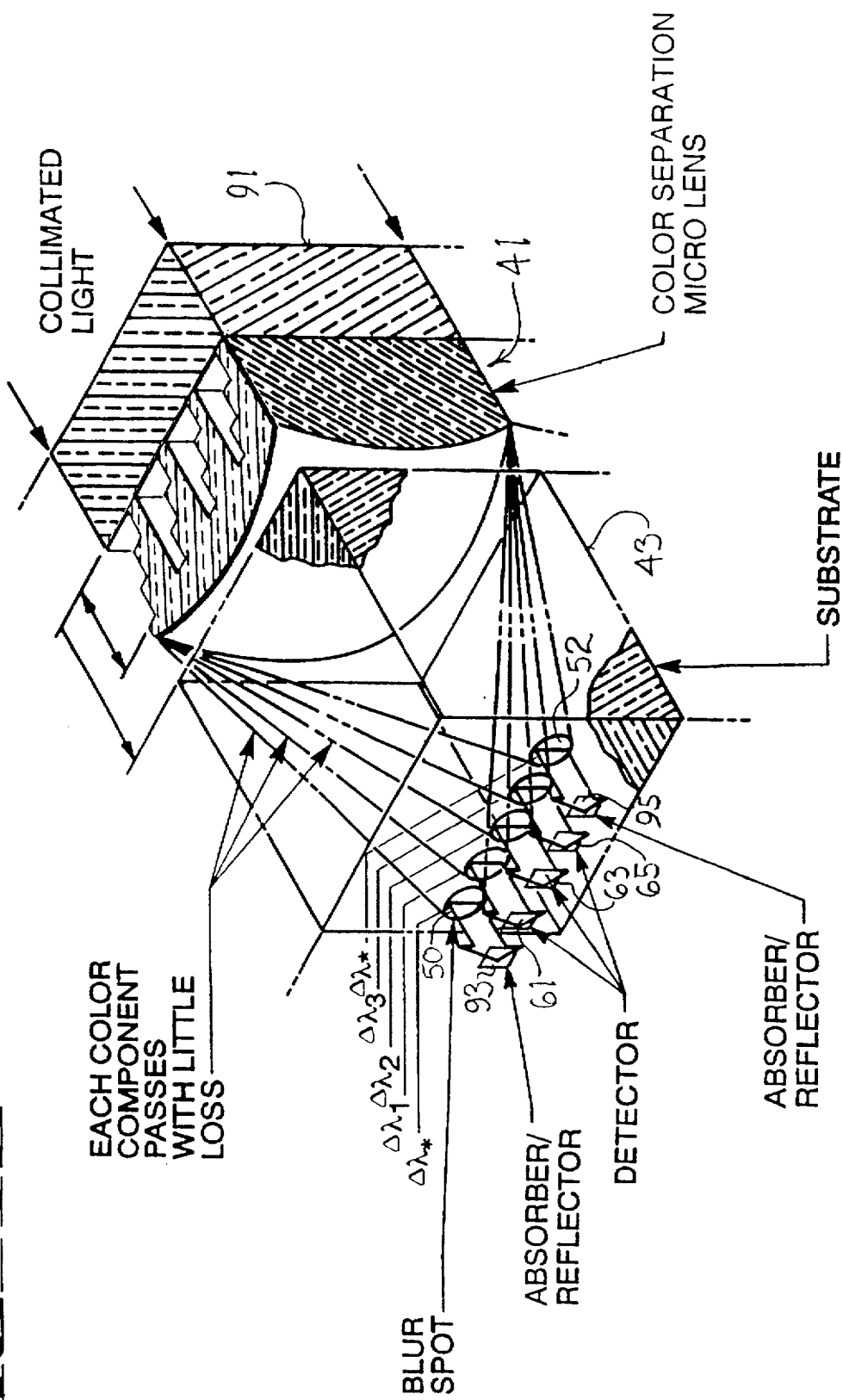
FIG_13

FIG_14
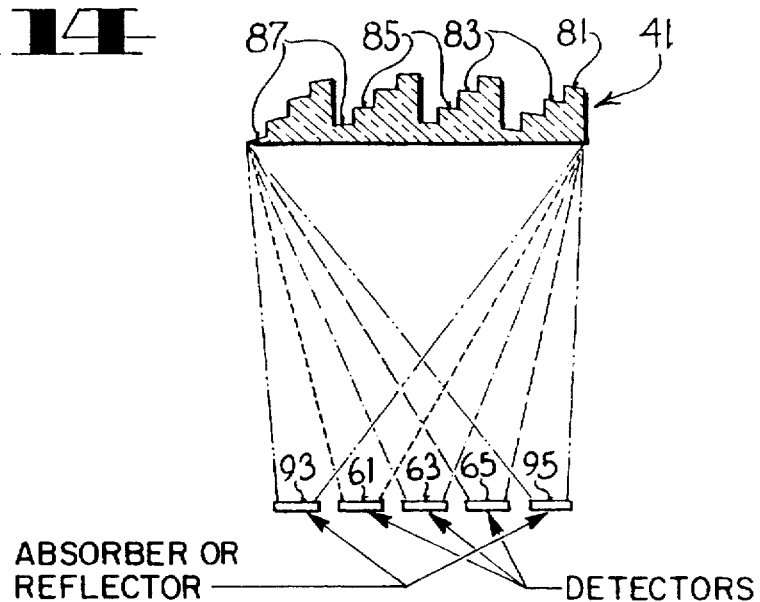
ABSORBER OR
REFLECTOR
DETECTORS
FIG_15
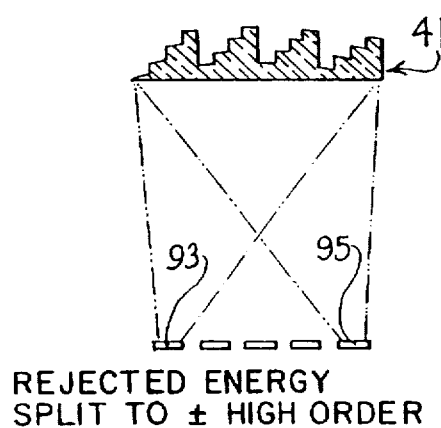
REJECTED ENERGY
SPLIT TO ± HIGH ORDER
FIG_16
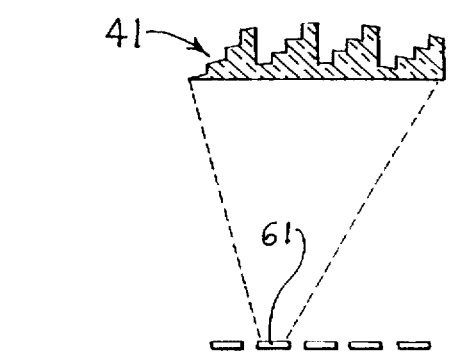
PASSED ENERGY
SENT TO LOW ORDER
FIG_17
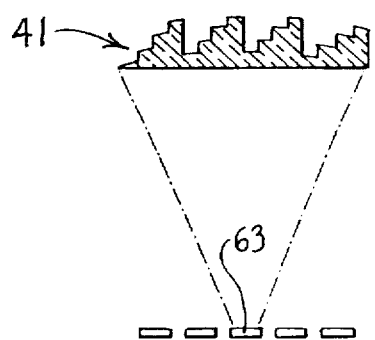
PASSED ENERGY
SENT TO LOW ORDER
FIG_18
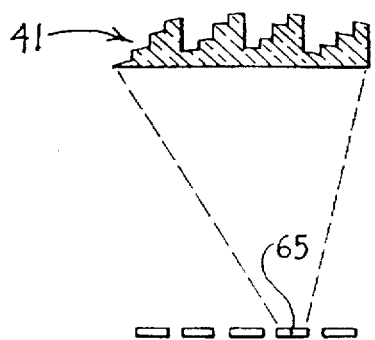
PASSED ENERGY
SENT TO LOW ORDER

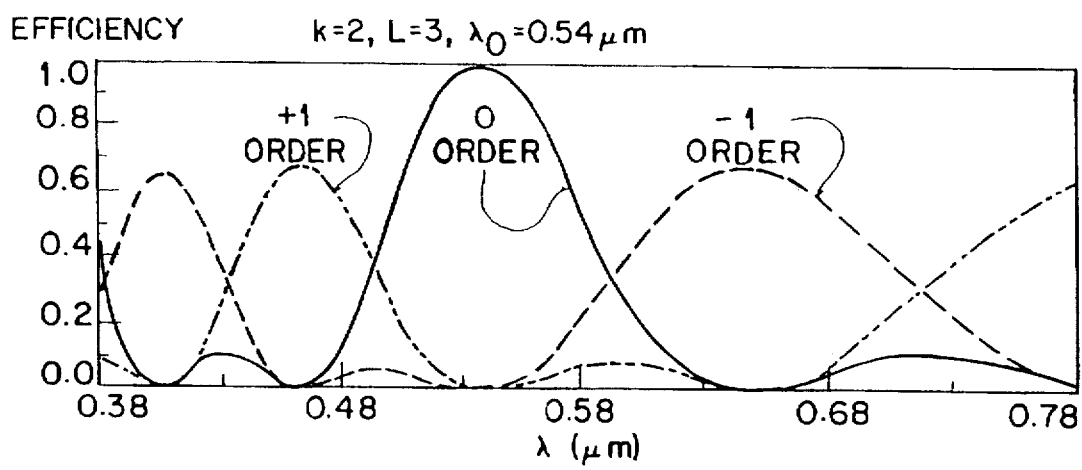
FIG_19
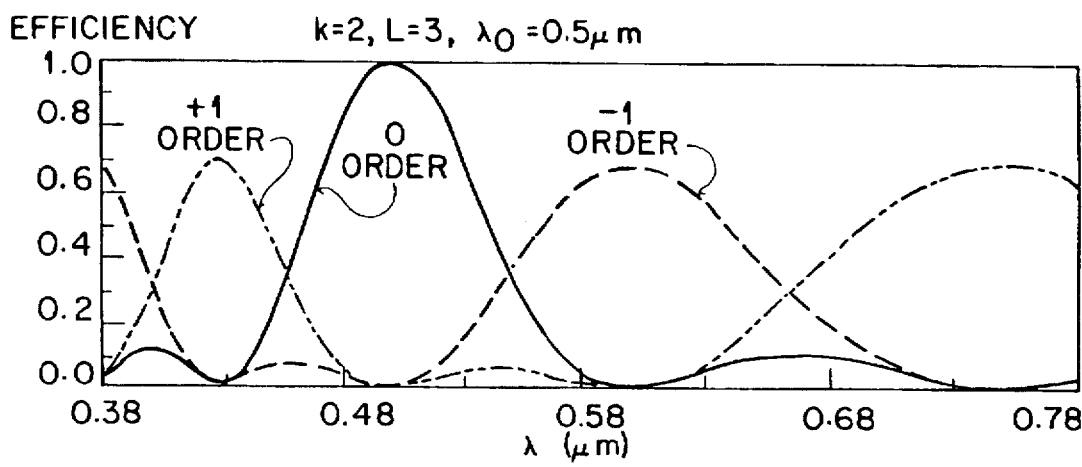
FIG_20
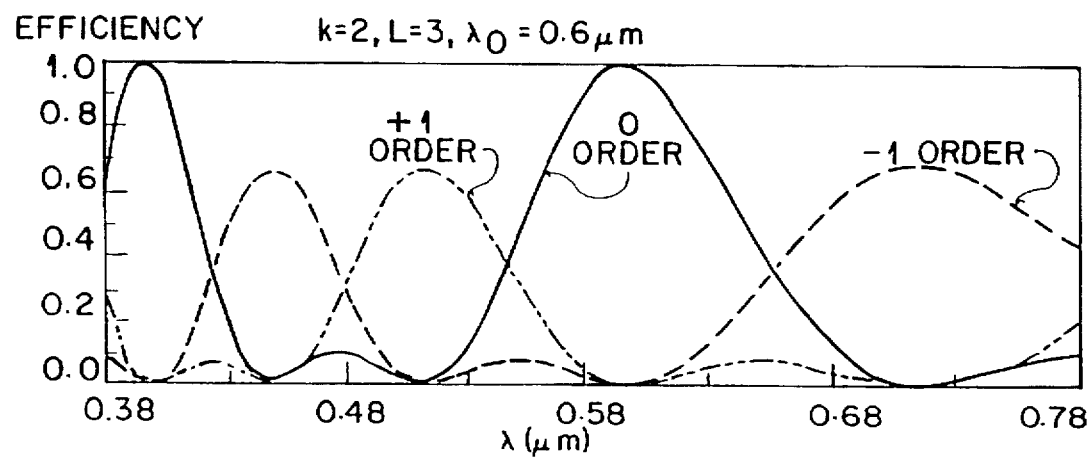
FIG_21

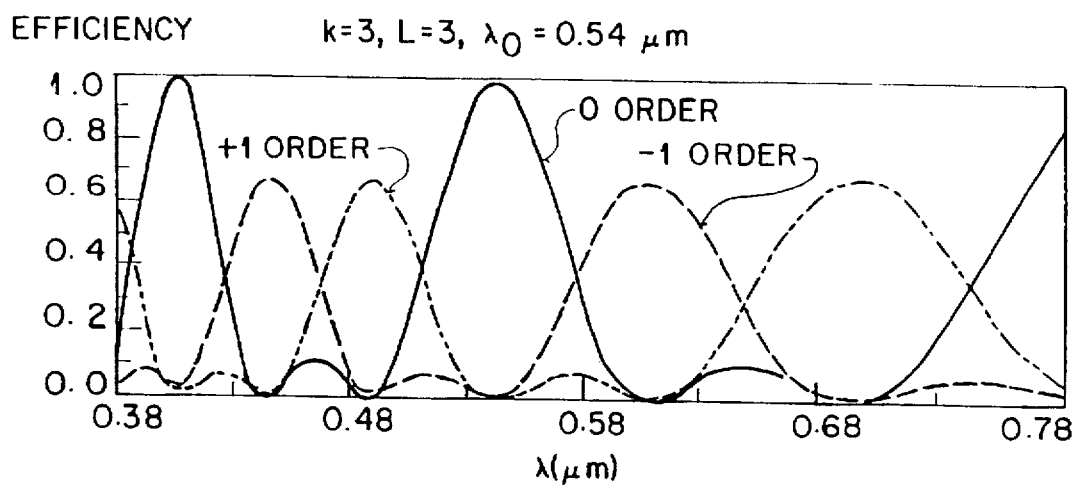
FIG_22
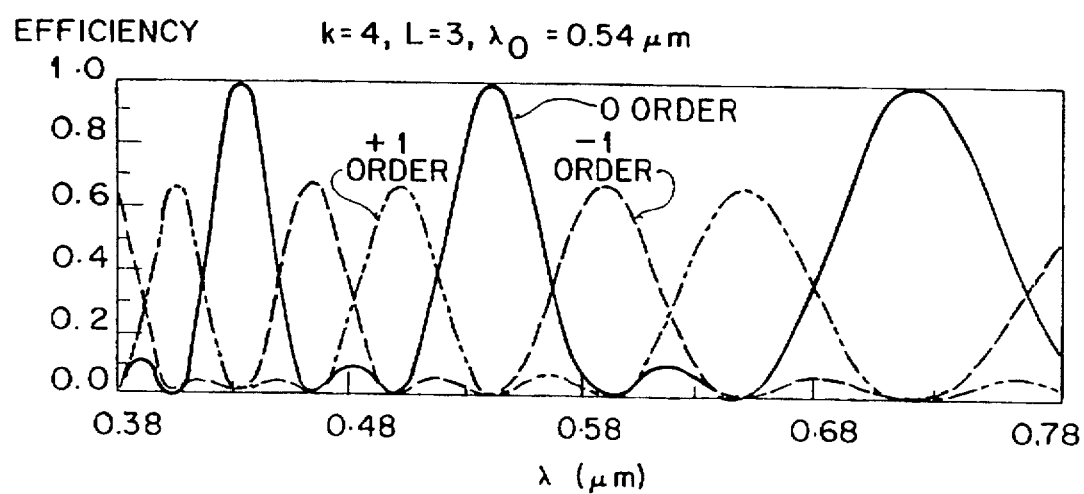
FIG_23

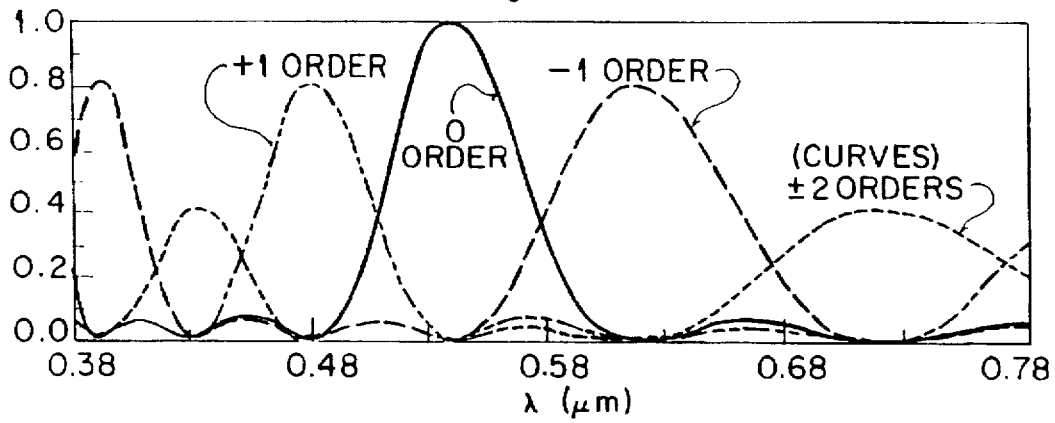
FIG_24
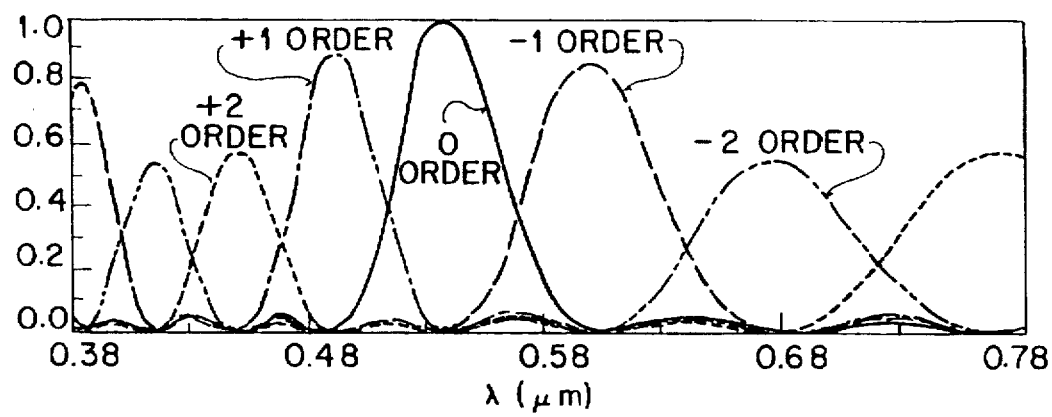
FIG_25
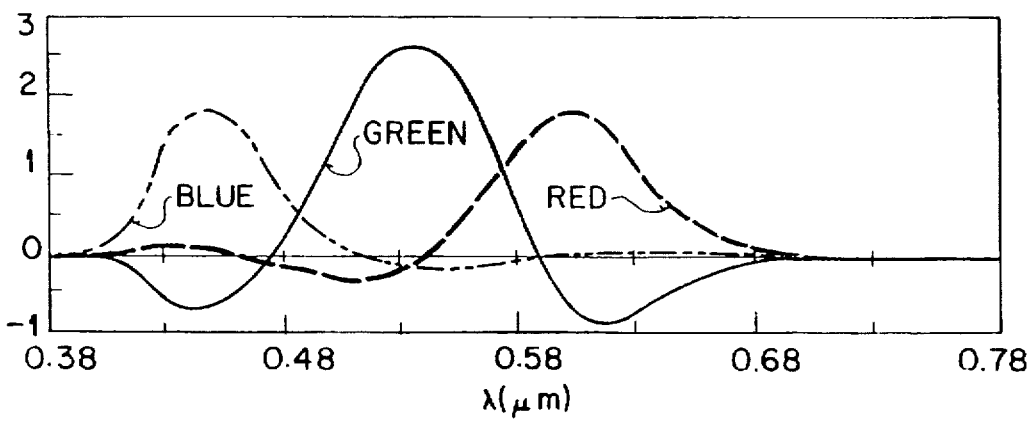
FIG_28

FIG_27
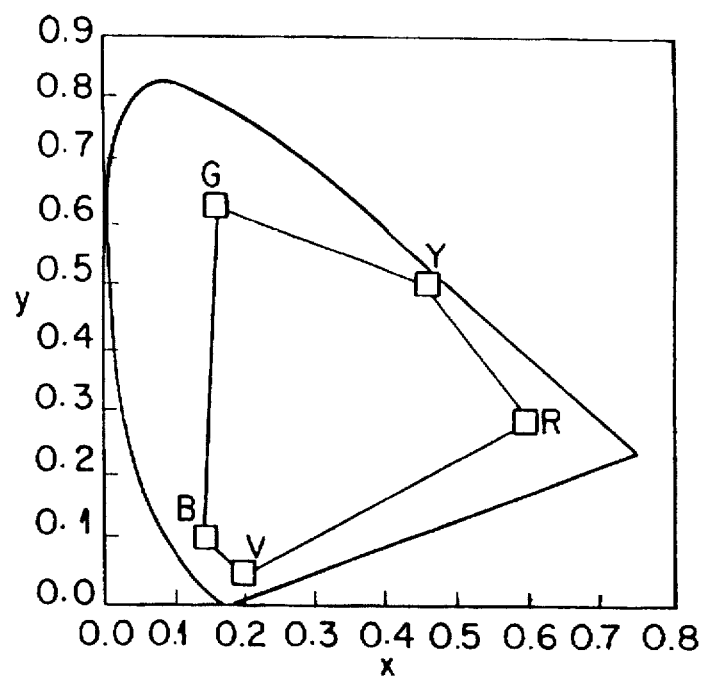
FIG_26
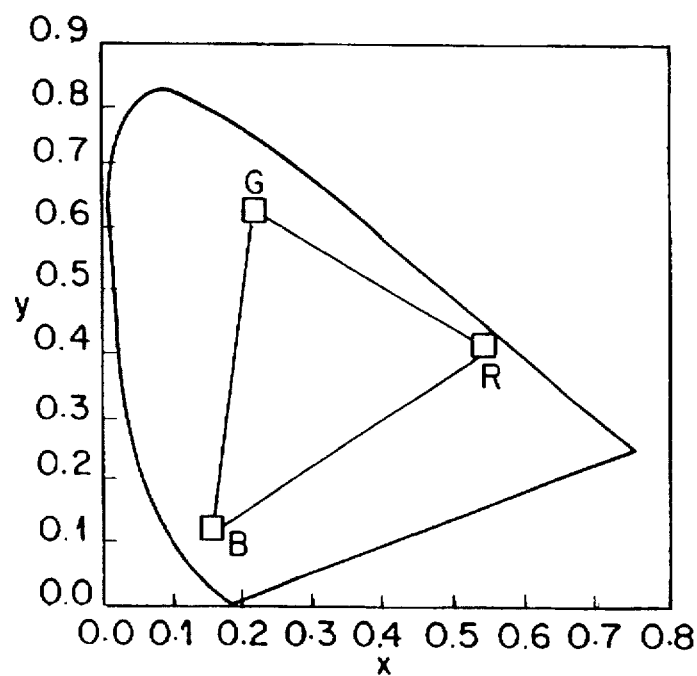

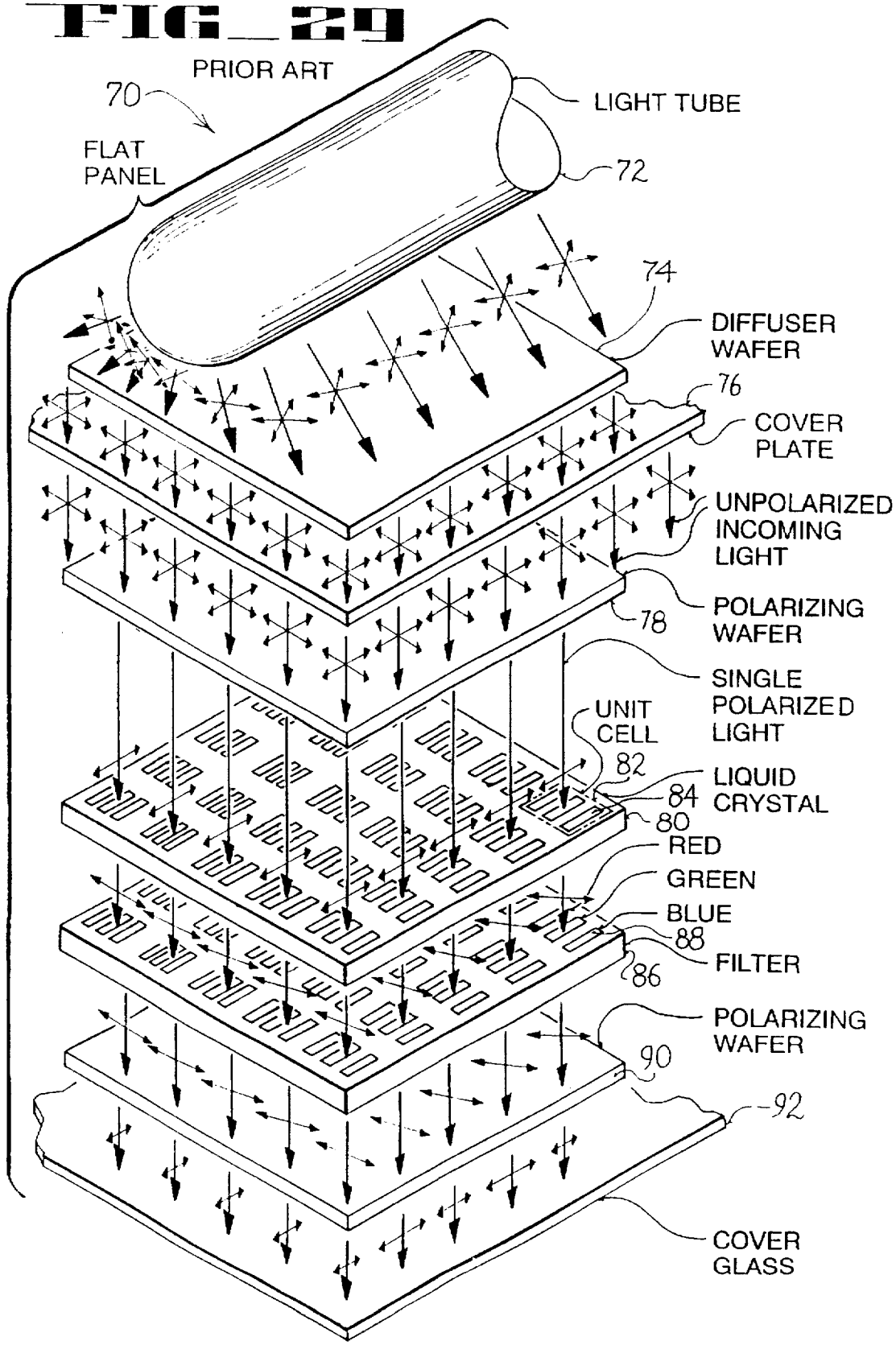
FIG_29 PRIOR ART

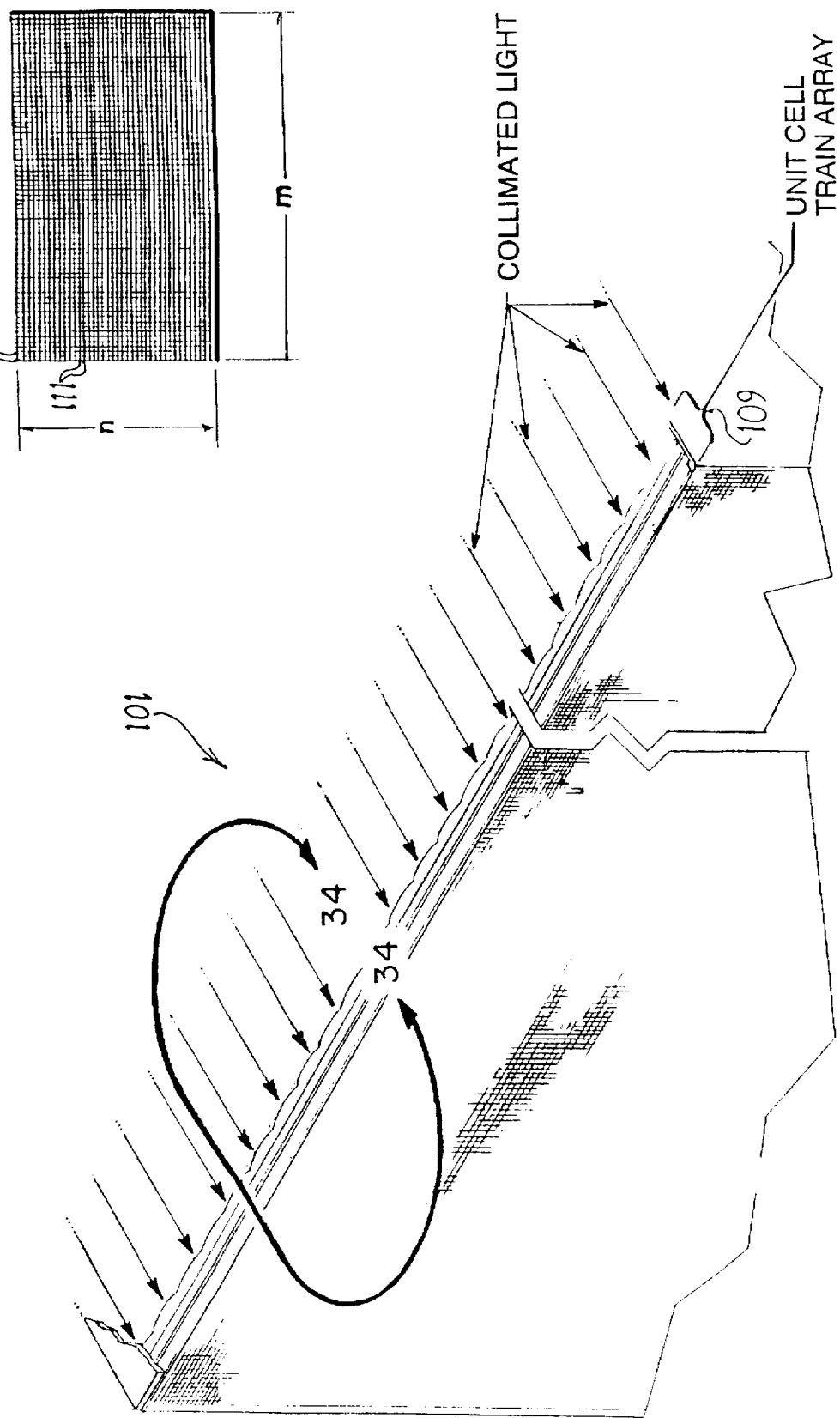

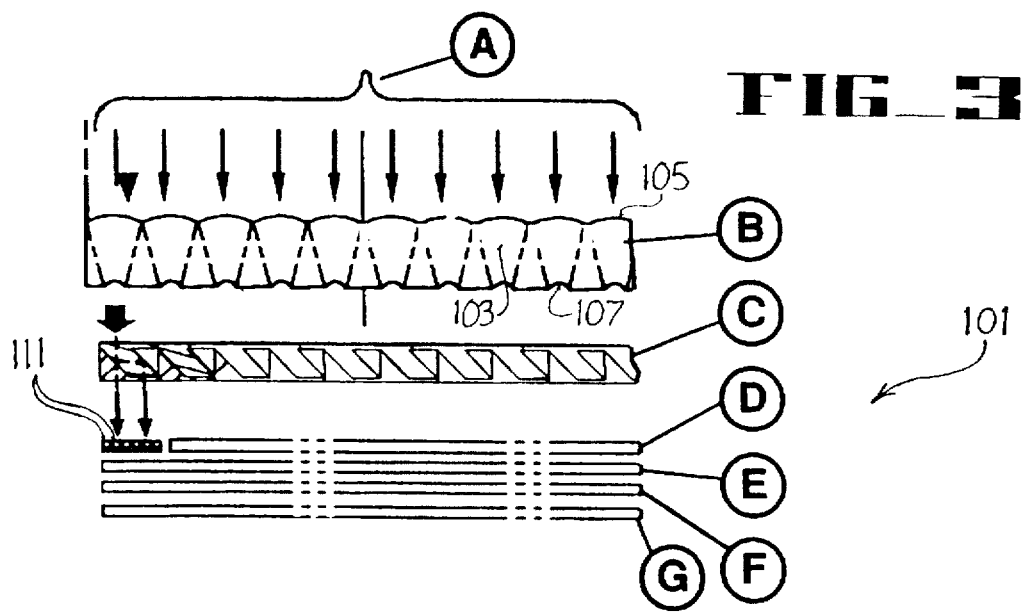

FIG_32

FIG_33

| FLAT PANEL COMPONENTS | USE | BENEFITS |
|---|---|---|
| (A) COLLIMATED LIGHT $L_c$ =mm | BACK ILLUMINATING LIGHT SOURCE | • UNIFORM LIGHT SOURCE |
| (B) MULTIPLEXING MICRO-WAFER $L_c$ =mm | REFORMATTING ILLUMINATING LIGHT | |
| (C) POLARIZATION WAFER $L_c$ =mm | ALIGN ALL LIGHT INTO SAME POLARIZATION | • UTILIZE 100% OF ILLUMINATING LIGHT |
| (D) COLOR SEPARATION MICROLENS ARRAY $L_c$ = 25-200 μm | RGB COLOR PRIMARIES | • ELIMINATES COLOR FILTER<br>• ELIMINATES DEPOLARIZATION LOSS<br>• ELIMINATES ABSORPTION LOSS<br>• INCREASES LIGHT THROUGHPUT<br>• MEETS MILITARY THERMAL SPECS |
| (E) LIQUID CRYSTAL WAFER $L_c$ = 10-70 μm | ENCODE COLOR INFORMATION IN PIXEL | |
| (F) POLARIZER | MODULATE RGB LIGHT INTENSITIES | |
| (G) ANAMORPHIC LENS ARRAY $L_c$ = 25-200 μm | FOV CONTROL | • APPLICATION DEPENDENT CONTROL OF FOV<br>• ELIMINATES MOIRE EFFECT |

(Rows D-G: UNIT CELL TRAIN)

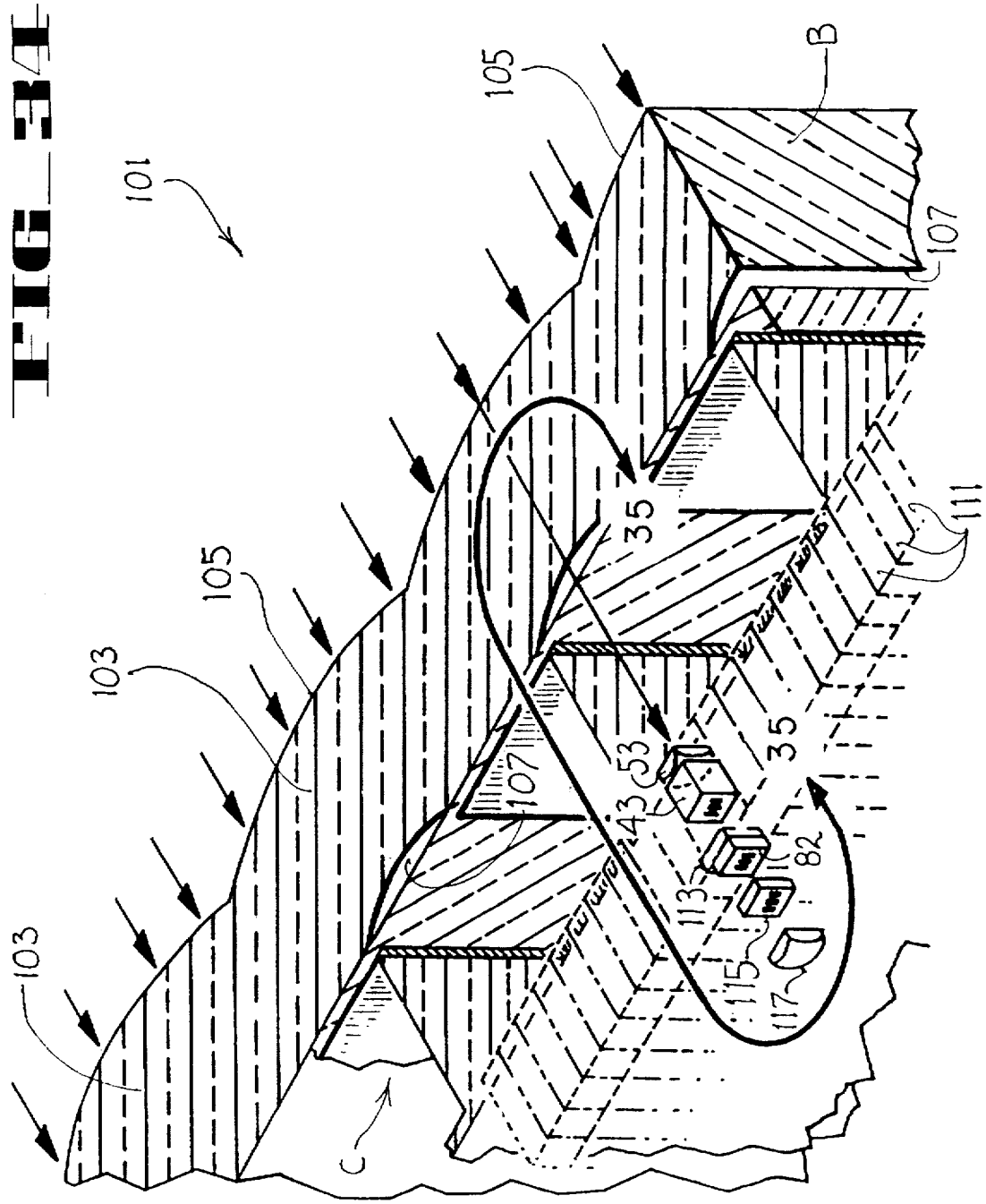

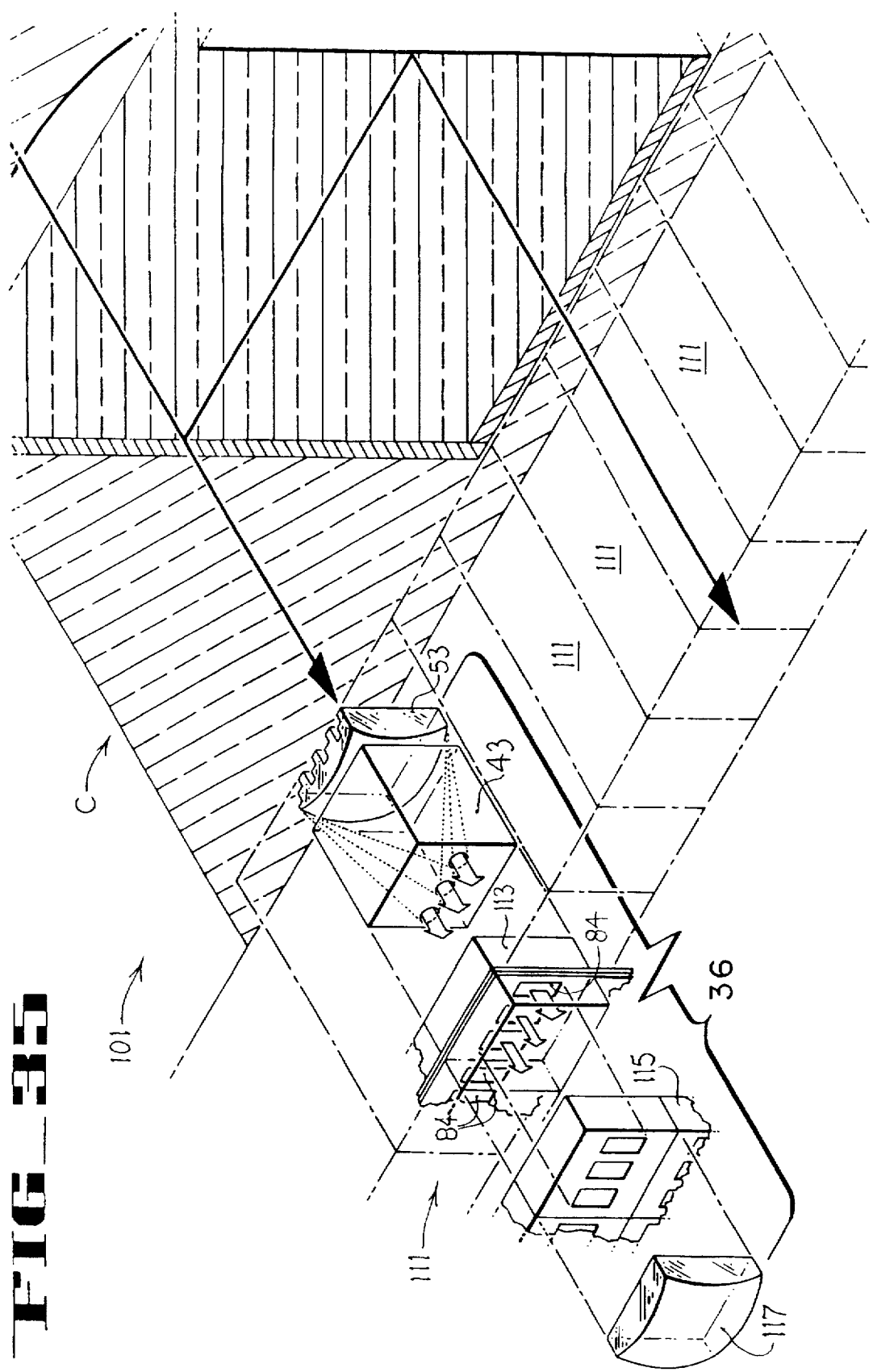

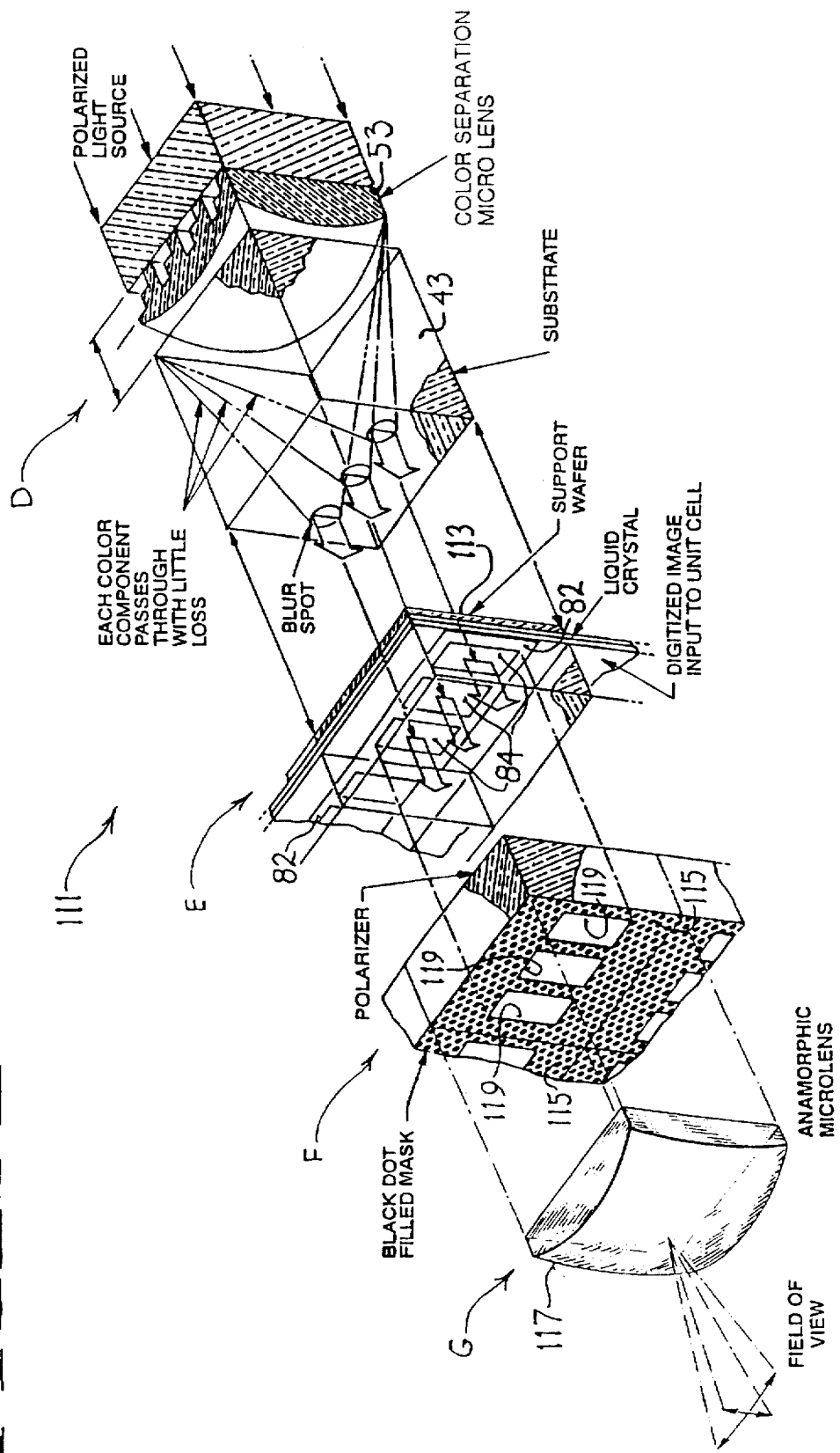
FIG_36

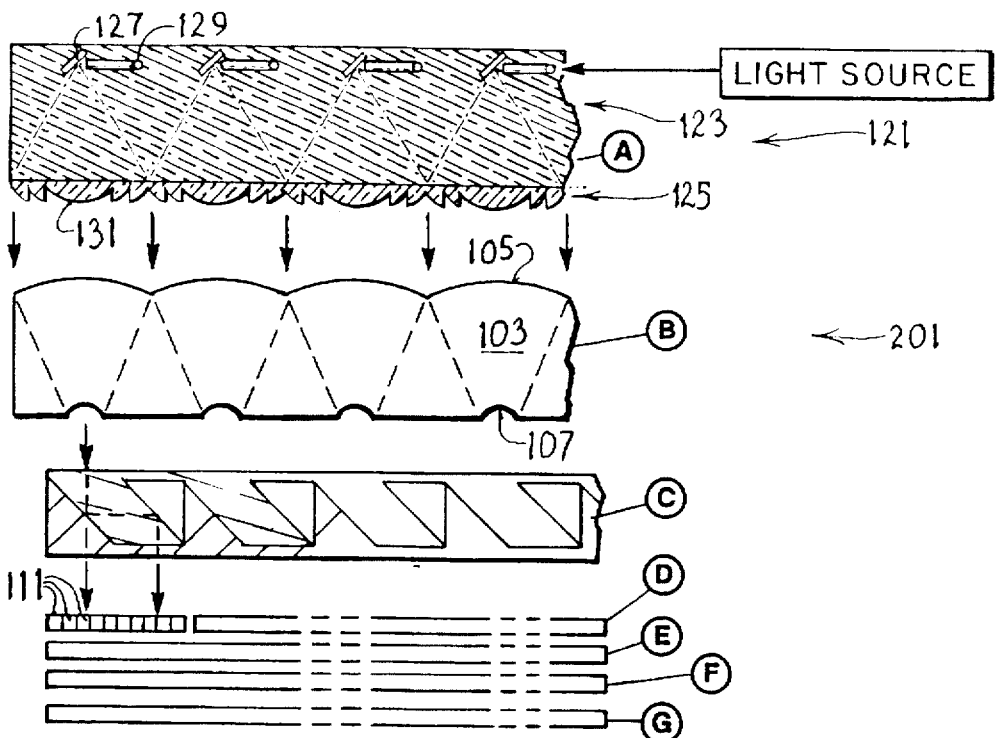

FIG_37

FIG_38

| FLAT PANEL COMPONENTS | USE | BENEFITS |
|---|---|---|
| (A) LIGHT PANEL AND COLLIMATING OPTICS $L_c$ =mm | BACK ILLUMINATING LIGHT SOURCE | • UNIFORM LIGHT SOURCE |
| (B) MULTIPLEXING MICRO-WAFER $L_c$ =mm | REFORMATTING ILLUMINATING LIGHT | |
| (C) POLARIZATION WAFER $L_c$ =mm | ALIGN ALL LIGHT INTO SAME POLARIZATION | • UTILIZE 100% OF ILLUMINATING LIGHT |
| (D) COLOR SEPARATING MICROLENS ARRAY $L_c$ = 25-200 μm | RGB COLOR PRIMARIES | • ELIMINATES COLOR FILTER<br>• ELIMINATES DEPOLARIZATION LOSS<br>• ELIMINATES ABSORPTION LOSS<br>• INCREASES LIGHT THROUGHPUT<br>• MEETS MILITARY THERMAL SPECS |
| (E) LIQUID CRYSTAL WAFER $L_c$ = 10-70 μm | ENCODE COLOR INFORMATION IN PIXEL | |
| (F) POLARIZER | MODULATE RGB LIGHT INTENSITIES | |
| (G) ANAMORPHIC LENS ARRAY $L_c$ = 25-200 μm | FOV CONTROL | • APPLICATION DEPENDENT CONTROL OF FOV<br>• ELIMINATES MOIRE EFFECT |

(Rows D–G bracketed as UNIT CELL TRAIN)

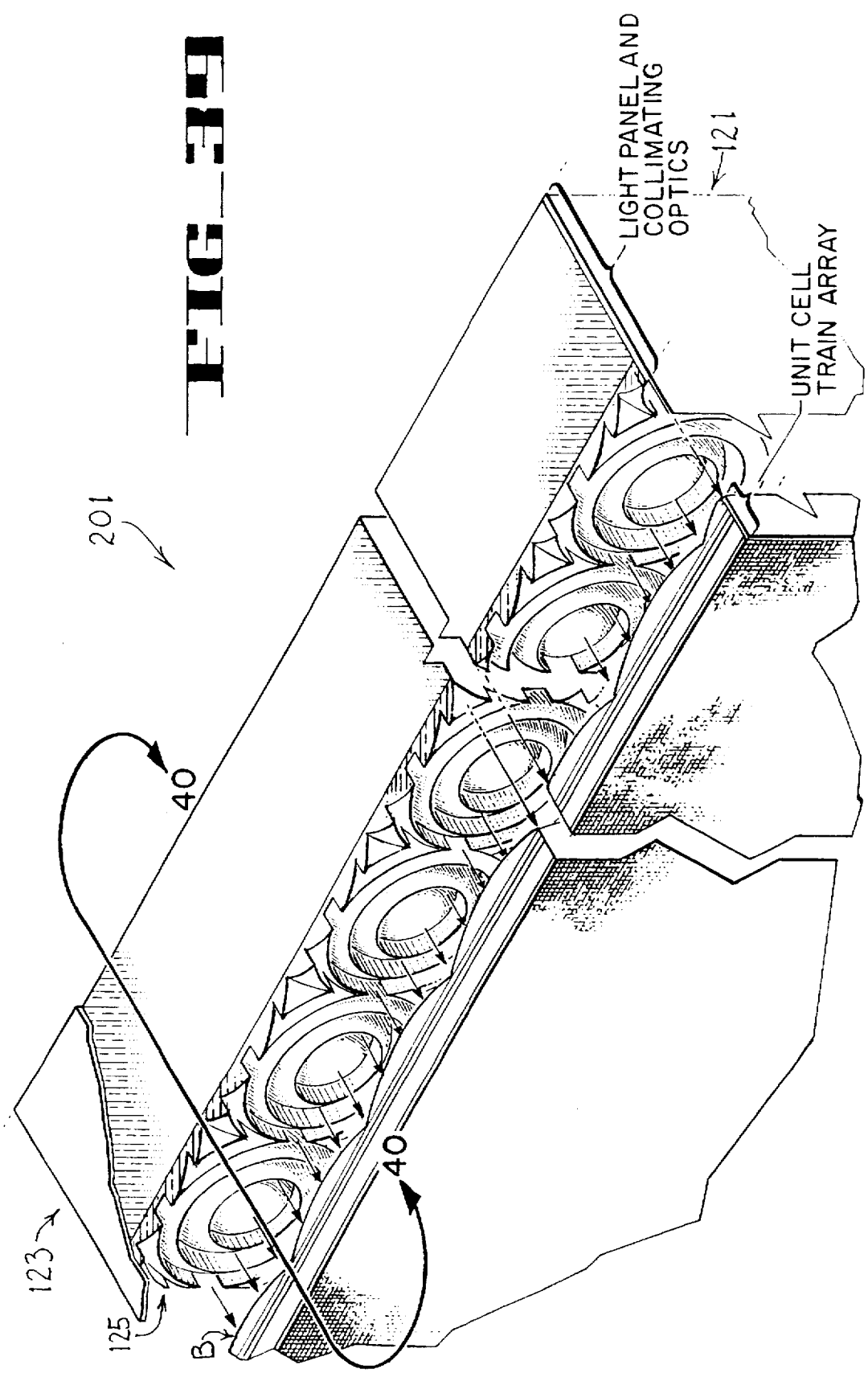

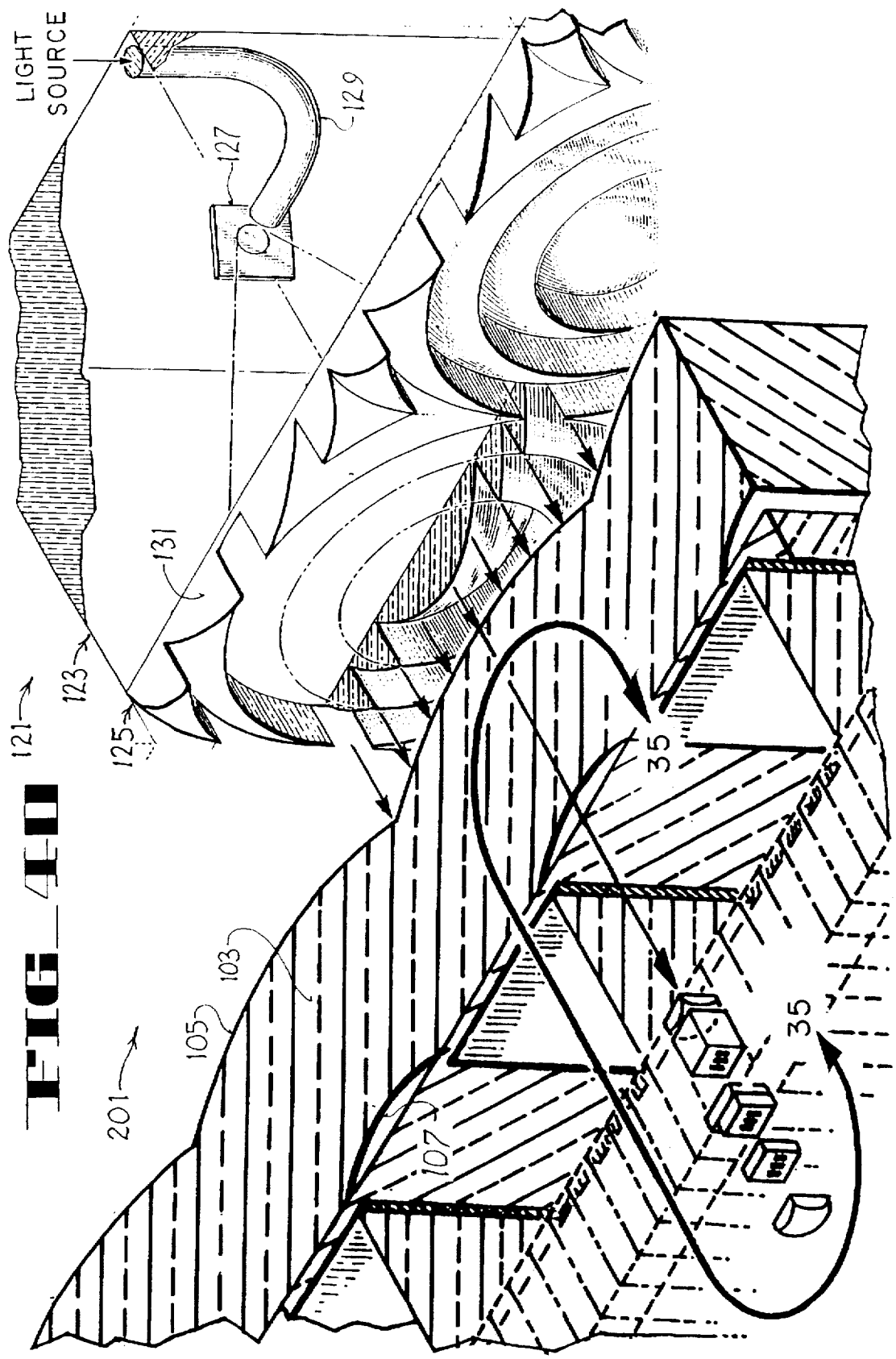

FLAT PANEL DISPLAY

This is a continuation-in-part of application Ser. No. 08/380,109 filed on Jan. 30, 1995, now U.S. Pat. No. 5,600,486.

RELATED U.S. PATENT APPLICATION

This application is a continuation-in-part of pending U.S. application Ser. No. 08/380,109 filed Jan. 30, 1995 by George Gal and Bruce J. Herman (inventors) and entitled "Color Separation Microlens" and assigned to the same assignee as the assignee of this application. This application claims the benefit of the Jan. 30, 1995 filing date of the subject matter common to the parent application Ser. No. 08/380,109 and this application.

BACKGROUND OF THE INVENTION

This invention relates to a flat panel display.

This invention relates in particular to a flat panel display which incorporates an array of color separation microlenses. Each color separation microlens in the array is a single micro-optical element which disperses color by orders into distinct color spots and which focuses these spots of separated color to related liquid crystal sub-pixels located in a common plane. The color separation microlenses provide color separation, and color separation filters are not required in the flat panel display of the present invention.

Prior art flat panel displays have used liquid crystal arrays having a plurality of individual liquid crystal unit cells with each unit cell in the liquid crystal array corresponding to a pixel in the final image as displayed.

Each unit cell included a number (usually three) of separate, spaced apart, individually controlled, liquid crystal sub-pixels.

Selective energization of a particular liquid crystal sub-pixel permitted the amount of light transmitted through that liquid crystal sub-pixel to be modulated.

The only light which could be transmitted through the unit cell was the light which fell directly on a light transmitting liquid crystal sub-pixel. All of the light which fell on areas of the unit cell outside the liquid crystal sub-pixel was lost.

The color for displaying color images in the prior art flat panel displays was obtained by the use of color filters, for example, red, green, blue (RGB) color filters.

A color filter of a particular color was aligned with each liquid crystal sub-pixel.

If light was transmitted through a particular liquid crystal sub-pixel, then the transmitted light also passed through a related color filter of a particular color. The only light which could pass through the color filter was light which had the filtered color. Other colors of the light transmitted to the color filter were blocked by the color filter, and were lost.

The amount of light loss in color filters of prior art flat panel displays was also significant.

The prior art flat panel display structures therefore embodied inherent inefficiencies in terms of the ratio of the brightness of the display to the intensity of the illumination.

It is an object of the present invention to construct a flat panel display which eliminates certain problems of prior art flat panel displays.

It is a specific object of the present invention to construct a new flat panel display which makes more efficient use of light transmitted through the display than was possible with prior art flat panel displays.

It is another specific object of the present invention to construct a new flat panel display which eliminates color filters (and which therefore eliminates the losses inherent in color filters) and which has other unexpected benefits over prior art flat panel displays.

It is another specific object of the present invention to construct a flat panel display which embodies an array of unitary, color separation microlenses, with each color separation microlens in the array being effective to separate colors of the spectral band by diffraction orders and to focus the separated colors in distinct, separate spots in a common plane.

SUMMARY OF THE INVENTION

A flat panel display for displaying color images in accordance with the present invention includes a back illuminating light source for supplying a spectral band of illuminating light.

A polarizer receives the illuminating light from the back illuminating light and polarizes all the illuminating light into a single polarization at an outlet of the polarizer.

An array of color separation microlenses is positioned at the outlet of the polarizer. The array of color separation microlenses comprises a plurality of unitary, color separation microlenses each of which is constructed to separate colors of a spectral band by diffraction orders and to focus the separated colors in separate distinct spots in a common plane.

A liquid crystal wafer is located at the common plane. The liquid crystal wafer provides a plurality of unit cells with each unit cell having a separate, liquid crystal sub-pixel at each distinct spot of separated color.

Each liquid crystal sub-pixel is separately controllable so the amount of light transmitted through that liquid crystal sub-pixel can be modulated.

A pixel array for viewing the colors transmitted through the unit cells in the liquid crystal array is aligned with the liquid crystal wafer.

Substantially all of the light transmitted through the array of color separation microlenses falls directly on the separate liquid crystal sub-pixels so that substantially no light is lost by falling on areas outside the liquid crystal sub-pixels.

Because the color separation microlenses in the array of microlenses provide the color separation, no color filters are required in the flat panel display of the present invention. Eliminating the color filters eliminates the light losses which are incurred when transmitting light through a color filter.

The flat panel display of the present invention thus makes more efficient use of light transmitted through the components of the flat panel display structure than was possible with prior art flat panel displays.

Flat panel display apparatus and methods which incorporate the features described above and which are effective to function as described above constitute specific objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIGS. 1–28 of the drawing views of this application are duplicates of the respective FIGS. 1–28 of the drawing views of parent application Ser. No. 08/380,109 filed Jan. 30, 1995.

FIGS. 2–28 illustrate features of the color separation microlenses used in the flat panel display of the present invention.

FIG. 29 shows a prior art flat panel display structure.

FIGS. 30–40 of the drawing views illustrate features of the flat panel display of the present invention.

FIG. 1 is a diagrammatic and cross-sectional view which illustrates principles of operation and structure of a single, unitary, micro-optical element made up of a blazed diffraction grating integrated onto the surface of a refractive lens. The construction shown in FIG. 1 is disclosed and claimed in prior application Ser. No. 07/904,316 filed Jun. 25, 1992 and assigned to the same assignee as the assignee of this application.

FIG. 2 is a diagrammatic view, like FIG. 1, but shows two embodiments of a color separation microlens constructed in accordance with the present invention.

In the embodiment shown at the left hand side of FIG. 2 the color separation microlens is a monolithically integrated micro-optical element. In this embodiment a color separation grating separates colors of a spectral band by diffraction orders, and a lens surface focuses the separated colors to separate, distinct spots in a common focal plane (the plane shown at the bottom left hand side of FIG. 2). In this monolithically integrated embodiment, the grating and the lens surface are combined to a single surface.

In the other embodiment shown in FIG. 2 (the embodiment shown at the right hand side of FIG. 2) the grating is formed on one side of a dual-sided thin wafer, and the focusing lens surface is formed on the other side of the dual-sided thin wafer.

FIG. 3 is a table which compares certain features of the blazed dispersive microlens shown in FIG. 1 with certain features of the color separation microlens shown in FIG. 2. The right hand column of FIG. 3 notes several novel features of the color separation microlens of the present invention.

FIG. 4 is graph showing an example of (spectral) efficiency curves for a color separation microlens constructed in accordance with the present invention. Each curve in FIG. 4 represents the efficiency for a different order. The plots shown in FIG. 4 show what fraction of light at a given wavelength is sent to each order.

FIG. 5 is a plan view of diffraction spots produced at a focal plane (the lowermost plane shown in FIG. 2). The diffraction spots in FIG. 5 are lined to represent the different colors (e.g., red-green-blue colors) produced in the diffraction spots for a color separation microlens whose efficiency curves are those shown in FIG. 4.

FIG. 6 is an isometric view of a color separation microlens constructed in accordance with one embodiment of the invention (the monolithically integrated embodiment illustrated at the left hand side of FIG. 2). FIG. 6 illustrates one mode of operation in which the color separation microlens separates the spectrum of incoming light into distinct color spots.

FIG. 7 is a view like FIG. 6 but showing how, in another mode of operation, detectors are used at the separate, distinct diffraction spots to detect and/or to measure the energy in each separate color spot.

FIG. 8 is an isometric view like FIGS. 6 and 7 but illustrating how the color separation microlens of the present invention is used in another mode of operation to combine and to blend colors from distinct sources. In FIG. 8 the color sources are individual light emitting diodes. The diodes and associated optics provide angular distributions of light to correspond to light from different diffraction orders. The color separation microlens of the present invention blends the incoming orders to produce an outgoing spectral band (indicated by the block arrow in FIG. 8) at the upper, outlet face of the color separation microlens.

FIG. 8A is an isometric view like FIGS. 6, 7 and 8, but showing another mode of operation of a color separation microlens constructed in accordance with the present invention. In FIG. 8A the incoming light sources which are combined and blended are general, unspecified light sources (as indicated by the block arrows in FIG. 8A) rather than being specific light-emitting diodes and related optics as shown in FIG. 8.

FIG. 9 is a fragmentary, isometric view of the top surface of the monolithically integrated color separation microlens shown at the left hand side of FIG. 2 and also shown in FIGS. 6–8A. FIG. 9 presents an upper, isometric view of the grating periods and shows how each grating period, in this particular embodiment of the present invention, has spaced steps in the grating period.

FIG. 10 is a cross sectional view of a monolithically integrated color separation microlens constructed in accordance with the embodiment of the invention shown in the left hand side of FIG. 2. FIG. 10 also contains a table (at the bottom of FIG. 10) which discloses dimensions for typical applications of the particular embodiment of the color separation microlens (shown at the top of FIG. 10).

FIG. 11 is an isometric view similar to FIG. 6 but showing a color separation microlens constructed in accordance with the dual-sided, thin wafer embodiment of the present invention (the embodiment shown on the right hand side of FIG. 2). FIG. 11, like FIG. 6, illustrates a mode of operation in which the color separation microlens separates the spectrum of incoming light to distinct color spots. In FIG. 11, each grating period has three spaced steps and produces three diffraction orders.

FIG. 12 is an isometric view showing the dual-sided, thin wafer, color separation microlens embodiment of the present invention. There are five steps in each grating period of the embodiment shown in FIG. 12, and the color separation microlens produces five diffraction orders.

FIG. 13 is a isometric view like FIGS. 11 and 12, but FIG. 13 shows a special case embodiment of the color separation microlens of the present invention in which the high order is split and sent in equal intensities to the two outermost spots. In this special case embodiment, the high order can then be reflected or absorbed so as to be rejected or eliminated.

FIG. 14 is a side elevation, cross-sectional view through a monolithically integrated color separation microlens of the present invention. Each grating period in the embodiment shown in FIG. 14 has four steps, and the color separation microlens produces five diffraction orders. The color separation microlens construction shown in FIG. 14 produces five separate, distinct, focused spots. The efficiencies for the two outer spots are identical. FIG. 14 shows how absorbers or reflectors can be placed at the outer spots to totally absorb or to totally reflect the ±2 orders. Detectors are placed at the three central spots in this embodiment of the present invention.

FIGS. 15, 16, 17 and 18 are side elevation, cross-sectional views of the embodiment shown in FIG. 14, but each of FIGS. 15, 16, 17 and 18 has been simplified to illustrate how light from a single, particular order is transmitted through the color separation microlens and to the focused, diffraction spot at the focal plane.

FIG. 15 shows how the energy to be rejected is confined to the outer orders and is split to equal intensity spots at the outer ends of the line of spots at the focal plane so that this light can be rejected.

FIGS. 16, 17 and 18 show how energy passed through each of the other three orders is directed to related ones of the central spots for detection and/or measurement.

FIG. 19 is a graph which shows the efficiency curves for certain parameters of the design equation for a particular design of a color separation microlens constructed in accordance with the present invention. The efficiency curves are shown in FIG. 19 for the parameters k=2, L=3, and $\bar{\lambda}$=0.54 micrometers.

FIGS. 20 and 21 are graphs like FIG. 19 but showing the effect of altering the parameter $\bar{\lambda}$ in the efficiency curve. FIGS. 20 and 21 show in particular that changing the value of $\bar{\lambda}$ changes the relative positions of the efficiency curves. The value of $\bar{\lambda}$ denotes the wavelength at which the peak value of the zero order efficiency curve will lie. The parameters for FIG. 20 are k=2, L=3, and $\bar{\lambda}$=0.5 micrometers. The parameters for FIG. 21 are k=2, L=3, and $\bar{\lambda}$=0.6 micrometers.

FIGS. 22 and 23 are graphs like FIGS. 19–21 but show the effect of altering the parameter k (which is always an integer). These FIGS. 22 and 23 show in particular that as k is increased the efficiency curves are compressed toward $\bar{\lambda}$. Not shown, but also true, is the fact that when k is decreased, the efficiency curves expand around $\bar{\lambda}$. The parameters for FIG. 22 are k=3, L=3, and $\bar{\lambda}$=0.5 micrometers. The parameters for FIG. 23 are k=4, L=3, and $\bar{\lambda}$=0.54 micrometers. The widths of the efficiency curves are controlled by the parameter k.

FIGS. 24 and 25 are graphs like FIGS. 19–23 but show the effect of altering the parameter L (an integer). FIGS. 24 and 25 show in particular that only orders whose magnitudes are less than or equal to $L/2 (|m| \leq L/2)$ have significant efficiency amplitudes. When L is even, the $\pm L/2$ orders have identical efficiency curves. The parameters for FIG. 24 are k=2, L=4, and $\bar{\lambda}$=0.54 micrometers. The parameters for FIG. 25 are k=2, L=5, and $\bar{\lambda}$=0.54 micrometers. The orders which have significant efficiency amplitudes are controlled by the parameter L.

FIG. 26 is a graph which shows the chromaticities of the spots produced by a color separation microlens designed to give a maximum color gamut with three primaries. The primaries correspond to red, green and blue colors. Any color which lies within the color gamut (i.e., within the polygon with vertices described by the primaries) can be reproduced for display by appropriately adjusting the amounts of the primaries. The calculation made to design this element assumed that the element was illuminated by an equal energy spectrum (i.e., an equal amount of energy at each wavelength across the visible band). If the spectrum of the illuminating light can be controlled (e.g., by choosing proper phosphors for a fluorescent lamp) then an even larger color gamut can be obtained. Controlling the spectrum of the illuminating light gives a larger design freedom for the color gamut.

FIG. 27 is a graph like FIG. 26 but showing the chromaticities of the spots produced by a color separation microlens designed to give a maximum color gamut with five primaries. The primaries correspond to red, yellow, green, blue and violet colors.

FIG. 28 is a graph which shows the color matching curves corresponding to a color separation microlens which has the efficiency curves of FIG. 26.

FIG. 29 is an isometric, exploded, fragmentary view showing the components and functions of a prior art flat panel display structure.

FIG. 30 is an isometric view, partly broken away to show details of construction of a flat panel display constructed in accordance with one embodiment of the present invention.

FIG. 31 is a front elevation view showing an array of unit cell trains having color separation microlenses arranged in "m" columns and "n" rows as used in the flat panel display of the present invention.

FIG. 32 is a diagrammatic, fragmentary, top plan view showing components of the embodiment of the flat panel display shown in FIG. 30.

FIG. 33 is a chart which lists the components of a unit cell train of the embodiment of the flat panel display shown in FIGS. 30 and 32. FIG. 33 correlates the components to the components indicated in FIG. 32 and indicates particular uses and benefits of the specific components. The $L_c$ terms in the first column of FIG. 33 indicates the characteristic length for each of the respective components A–G.

FIG. 34 is an isometric, fragmentary, enlarged view of the portion of the flat panel display shown encircled by the arrows 34—34 in FIG. 30. FIG. 34 also shows (within the portion of FIG. 34 encircled by the arrows 35—35) isometric views of the components of one unit cell train within an array of unit cell trains.

FIG. 35 is an isometric, enlarged, fragmentary view of the portion of the FIG. 34 structure which is encircled by the arrows 35—35 in FIG. 34 and in FIG. 40. FIG. 35 shows additional details of a unit cell train incorporating a color separation microlens, a liquid crystal wafer, a polarizer, and an anamorphic lens (the respective components D, E, F, and G listed in the Table of FIG. 33.)

FIG. 36 is an enlarged, isometric, fragmentary view of a unit cell train which is indicated by the bracket 36 in FIG. 35. Portions of the components shown in FIG. 36 have been broken away to show details of construction. Legends are also utilized in association with the components shown in FIG. 36 to assist in understanding the structures and functions of the respective components illustrated.

FIG. 37 is a top plan view (like FIG. 32) but showing another embodiment of a flat panel display constructed in accordance with the present invention.

FIG. 38 is a chart (like FIG. 33) but correlated to the components illustrated in FIG. 37.

FIG. 39 is an enlarged, isometric view (like FIG. 30) but showing details of a light panel and collimating optics used as the illumination source in the embodiment of the flat panel display illustrated in FIGS. 37 and 38.

FIG. 40 is an enlarged, isometric view (like FIG. 34) but showing how the light panel and collimating optics of the embodiment shown in FIG. 39 are associated with a particular unit cell train (the unit cell train structure shown encircled by the arrows 35—35 in FIG. 40 and having the components and functions shown in FIGS. 35 and 36). FIG. 40 is an enlarged view of the structure shown encircled by the arrows 40—40 in FIG. 39.

DESCRIPTION OF THE PREFERRED EMBODIMENTS

FIGS. 1–28 of the drawing views of this application are duplicates of the respective FIGS. 1–28 of the drawing views of parent application Ser. No. 08/380,109 filed Jan. 30, 1995.

FIGS. 2–28 illustrate features of the color separation microlenses used in the flat panel display of the present invention.

FIG. 29 shows a prior art flat panel display structure.

FIGS. 30–40 of the drawing views illustrate features of the flat panel display of the present invention.

In the detailed description to follow, the terms "spectrum", "red", "green", "blue" and "color" will be used in connection with the description of the certain features of the invention. These terms will often be used for simplifying the detailed descriptions of the various embodiments of the invention, and some preliminary comments regarding these terms will be helpful to an understanding of the invention. Throughout the detailed description there will be a frequent need to refer to the "spectrum" of incoming light. In specific embodiments of the invention as shown in certain of the drawing views, the term "spectrum" will be used in respect to the visible spectrum (0.38 micrometers to 0.78 micrometers).

The color separation microlens can be used for other wavelength bands (e.g., short wavelength infrared, medium wavelength infrared, long wavelength infrared); so the term "spectrum" is not limited to the visible spectrum.

The terms "red", "green", and "blue" specifically refer to colors in the visible band, but these terms more generally can be associated with the long, mid, and short wavelengths of a different spectral band.

The term "color" will likewise be used to specify different regions of the wavelength band.

The color separation microlens of the present invention is a single, micro-optical element made up of a color separation grating (originally introduced by H. Dammann; see the article entitled "Color Separation Gratings" in the 1 Aug. 1978, Vol. 17, No. 15 edition of *Applied Optics* at pages 2273–2279) integrated with a refractive lens. This H. Dammann article is incorporated by reference in this application.

The color separation microlens of the present invention separates the spectrum into distinct color spots and focuses these spots to a common plane. The spots fall at the locations of the different diffractive orders. The color separation is done by the grating, and the focusing is done by the lens.

The color separation microlens of the present invention is an improvement over a blazed dispersive microlens disclosed and claimed in prior application Ser. No. 07/904,316 filed June 25, 1992 by George Gal and assigned to the same assignee as the assignee of this application. The prior, blazed dispersive microlens is a single, micro-optical element made up of a blazed, diffraction grating integrated onto the surface of a refractive lens. The blazed, dispersive microlens stretches the colors of the incoming light from blue to red in a single diffraction order and focuses the light down to a single diffraction spot.

FIG. 1 is a diagrammatic and cross-sectional view which illustrates principles of operation and structure of a single, unitary, micro-optical element made up of a blazed diffraction grating integrated onto the surface of the refractive lens (as disclosed and claimed in prior application Ser. No. 07/904,316 filed Jun. 25, 1992).

In FIG. 1, a blazed, dispersive microlens 31 is shown mounted on a substrate 33. The blazed, dispersive microlens 31 stretches the colors of the incoming light from blue to red in a single diffraction order and focuses the light down to a single diffraction spot 35.

The blue, green, and red colors within the single diffraction spot are indicated by the $\lambda_1$, $\lambda_2$, $\lambda_3$ characters below the single diffraction spot 35.

The top part of FIG. 1 illustrates how a blazed diffraction grating 37 and a focusing refractive lens 39 (as functional components) are incorporated within the single, upper surface of the unitary blazed dispersive microlens 31 shown in FIG. 1.

FIG. 2 is a diagrammatic and cross-sectional view like FIG. 1 that shows two embodiments of a color separation microlens constructed in accordance with the present invention.

The color separation microlens of the present invention is a single, micro-optical element made up of a color separation grating (originally introduced by H. Dammann as noted above) integrated with a refractive lens. The color separation microlens of the present invention separates the spectrum into distinct color spots and focuses these spots to a common plane. The spots fall at the locations of different diffraction orders. The color separation is done by the color separation grating and the focusing is done by the refractive lens.

FIG. 2 shows two different fabrication embodiments of the color separation microlens of the present invention.

In the embodiment shown at the left hand side of FIG. 2, the color separation microlens 41 is a monolithically integrated micro-optical element. In this embodiment, the grating and the lens are combined to a single, upper surface; and the flat lower surface of the color separation microlens is mounted on a substrate 43. The color separation microlens 41 separates the spectrum into distinct color spots 45, 47 and 49 in the common plane 51.

In the other embodiment 53 shown in FIG. 2 (the embodiment shown at the right hand side of FIG. 2), the grating is formed on one side of a dual-sided thin wafer (the upper side as illustrated) of a dual-sided thin wafer; and the focusing lens surface is formed on the other side (the lower side as illustrated) of the dual-sided thin wafer.

The color separation microlens 53 is shown mounted on a substrate 43.

The color separation microlens 53 separates the spectrum into distinct color spots 45, 47 and 49 and focuses these spots to a common plane 51.

As in the upper part of FIG. 1, the upper part of FIG. 2 illustrates how a color separation grating 59 is functionally associated with a refractive lens 39 in the single, unitary, color separation microlens embodiments 41 and 53.

There are two main differences between the color separation microlens shown in FIG. 2 and the blazed dispersive microlens shown in FIG. 1.

First, the blazed dispersive microlens separates colors in a single diffraction order.

The color separation microlens shown in FIG. 2 separates colors into distinct blur spots and different diffraction orders.

Second, the blazed dispersive microlens performs a linear stretch of color from one end to the waveband to the other.

The color content of the blur spots of the color separation microlens contain contributions from all wavelengths in the spectral band, with the weighting of the spectral content dependent on the diffraction order.

Generally speaking, the color separation of the color separation microlens is less pure than that of the blazed dispersive microlens.

The color separation microlens offers more design freedom than the blazed dispersive microlens.

FIG. 3 is a table which compares certain features of the blazed dispersive microlens shown in FIG. 1 with certain features of the color separation microlens shown in FIG. 2.

The right hand column of FIG. 3 notes several novel features of the color separation microlens of the present invention.

FIG. 4 is a graph showing an example of (spectral) efficiency curves for a color separation microlens constructed in accordance with the present invention.

Each curve in FIG. 4 represents the efficiency for the particular order indicated by the label for that curve.

The plots show what fraction of light at a given wavelength is sent to each order and is read as follows:

Choose a wavelength along the bottom axis.

Draw a vertical line at that wavelength from the bottom to the top of the plot.

At each point where the vertical line intersects one of the efficiency curves, read off the value of the height of the intersection from the vertical axis.

This value is a fraction of incident light at that wavelength which goes into the order whose efficiency curve has been intersected by the vertical line.

As an example, at $\lambda=0.60$ micrometers, the efficiencies of the $-1$, $0$, and $+1$ orders are read to be 0.35, 0.43 and 0.06, respectively. Thus, 84% of the incident light at 0.60 micrometers gets into the three central orders. The other 16% of light is sent to higher orders (not shown in FIG. 4). The design parameters for the color separation microlens whose efficiencies are shown in this FIG. 4 where $k=1$, $L=5$, $\lambda=0.525$ micrometers. The meaning of these parameters will be discussed in more detail below with respect to the design equation for the color separation microlens that describes the spectral efficiencies for a particular design.

FIG. 4 introduces the efficiency curves for a color separation microlens constructed in accordance with the present invention. An understanding of the efficiency curves is essential in the design of a color separation microlens.

FIG. 4 illustrates the ability to control the spectral content of different diffraction orders in a color separation microlens constructed in accordance with the present invention.

FIG. 5 is a plan view of diffraction spots produced at a focal plane 51 (the lower most plane shown in FIG. 2). The diffraction spots 45, 47, and 49 shown in FIG. 5 are lined to represent the different colors (e.g., red, green, and blue colors) produced in the diffraction spots for a color separation microlens whose efficiency curves are those shown in FIG. 4. It should be noted that the spot separation and spot sizes are not uniform.

FIG. 5 demonstrates a typical result of physical spot color separation obtained with a color separation microlens constructed in accordance with the present invention.

The spot separation is a novel and important function and is an important benefit of the color separation microlens of the present invention.

FIG. 6 is an isometric view showing how a monolithically integrated microlens 41 (the embodiment shown in the left hand side of FIG. 2) is used in one mode of operation. Use in this mode is to separate the spectrum of the incoming light into distinct color spots 45, 47 and 49.

This mode of operation can be used for a device which requires a color display. The separate spots can be used as color primaries (e.g., red, green and blue).

FIG. 7 shows the monolithically integrated microlens 41 used in another mode of operation. In this mode of operation, the energy in each color spot is detected and/or measured by respective detectors 61, 63 and 65.

This mode of operation can be used for a device used to measure color content of an image (e.g., pickups for a color camera). The separately detected energies can be used to calculate the tristimulus values for a color in the image—the color in an image obtained from use of an array of the color separation microlenses 41.

FIG. 8 shows another mode of operation of an color separation microlens constructed in accordance with the present invention. In the use of the monolithically integrated microlens 41 shown in FIG. 8, the color separation microlens blends colors from distinct sources into a single color.

In the embodiment shown in FIG. 8, the color sources are light emitting diodes 67, 69 and 71, and each light emitting diode is associated with a related optic 73, 75 and 77 to provide the proper angular distribution of light to correspond to light from different diffraction orders.

FIG. 8A illustrates a use like the use shown in FIG. 8, but in FIG. 8A the light sources are unspecified (rather than being specific light emitting diodes in related optics as shown in FIG. 8).

In both FIG. 8 and FIG. 8A, the color separation microlens blends the incoming orders to produce an outgoing spectral band (indicated by the block arrow at the upper right hand ends of FIG. 8 and FIG. 8A).

The modes of operation illustrated in FIG. 8 and FIG. 8A can be used for a color display device where the individual display primaries are within the resolution of the human eye. The color separation microlens can be used to blend the primaries to achieve a desired color to combat the resolution issue.

FIG. 9 is a fragmentary, isometric view showing details of the top surface of the monolithically integrated color separation microlens 41.

FIG. 9 shows details of the grating periods, and shows how each grating period, in this particular embodiment illustrated in FIG. 9, has three spaced steps, 81, 83 and 85 in the grating period.

FIG. 10 is a cross-sectional view of the monolithically integrated color separation microlens 41. FIG. 10 also contains a table (at the bottom of FIG. 10) which discloses dimensions for typical applications of the particular embodiment of the color separation microlens shown at the top of FIG. 10.

The table at the bottom of FIG. 10 lists the very small spot sizes and separations that can be achieved with the color separation microlens of the present invention.

FIG. 11 is an isometric view similar to FIG. 6, but FIG. 11 shows a color separation microlens 53 constructed in accordance with the dual-sided, thin wafer embodiment of the present invention (the embodiment 53 shown on the right side of FIG. 2).

FIG. 11, like FIG. 6, illustrates a mode of operation in which the color separation microlens separates the spectrum of incoming light to distinct color spots.

In FIG. 11 each grating period has three spaced steps 81, 82 and 83 and produces three diffraction orders $m=0$, $m=-1$ and $m=+1$ at the respective spots 47, 45 and 49.

As indicated in FIG. 11, the step height of a grating is d so that the step 83 has a height d lower than the uppermost step 81 and the step 85 has a height 2d lower than the height from the uppermost step 81.

Usually the height and width of a step in the grating are constant within a grating period.

More design freedom can be obtained by allowing the step heights to be non uniform and the locations of the step jumps to be arbitrarily locating within a grating period (as will be discussed in more detail below with reference to the design equation for the color separation microlens.

FIG. 12 is an isometric view showing the dual-sided, thin wafer, color separation microlens embodiment of the present invention.

There are five steps in each grating period of the embodiment shown in FIG. 12, and the color separation microlens 53 produces five diffraction orders.

In both FIGS. 11 and 12 a substrate 91 is shown assembled at the upper, grating surface of the microlens 53. A substrate 53 is shown assembled at the refractive lens surface of the color separation microlens 53.

FIG. 12 illustrates how design freedom allows more than three spots to be generated.

FIG. 13 is an isometric view like FIGS. 11 and 12, but FIG. 13 shows a special case embodiment of the color separation microlens of the present invention in which the outside orders have the same efficiency curves so light is sent in equal intensities to the two outermost spots 50 and 52.

In this special case embodiment, the outside orders can then be reflected or absorbed so as to be rejected or eliminated.

In the FIG. 13 embodiment, detectors 61, 63 and 65 are placed under the three central spots, and absorbers 93 and 95 (or reflectors 93 and 95, or nothing) are placed under the outer two spots 50 and 52. The efficiencies for the two outer spots 50 and 52 are identical.

This FIG. 13 demonstrates the application of a color separation microlens as, for example, a laser line rejector. All of the energy at a selected wavelength can be split and sent to the two outer orders ($\lambda^*$) thus rejecting the energy at that wavelength. This is a novel application of the color separation microlens of the present invention for rejecting all light of a particular wavelength (and a majority of light in a band around that wavelength).

FIGS. 14–18 are side elevation, cross-sectional views of the embodiment shown in FIG. 14.

Each of FIGS. 15, 16, 17 and 18 has been simplified to illustrate how passed light is transmitted through the color separation microlens 41 and sent to the focused, diffraction spots at the focal plane.

FIG. 15 shows how the energy to be rejected is confined to the two outermost orders and is split to equal intensity spots at the outer ends of the line of spots at the focal plane so that this light can be rejected.

FIGS. 16, 17 and 18 show how energy to be detected is sent to the other three orders, each order corresponding to a central spot.

FIGS. 19–25 are a series of graphs which show the effects of changing various parameters which affect the efficiency curves for color separation microlenses constructed in accordance with the present invention.

FIG. 19 shows the efficiency curves for certain parameters of the design equation for a particular design of a color separation microlens. The efficiency curves are shown in FIG. 19 for the parameters k=2, L=3, and $\bar{\lambda}$=0.54 micrometers.

The design equation will be set out below and will be discussed in more detail below.

This FIG. 19 is also useful as a basis for comparison for the other FIGS. 20–25.

FIGS. 20 and 21 are graphs like FIG. 19 but showing the effect of altering the parameter $\bar{\lambda}$ in the efficiency curve.

FIGS. 20 and 21 show in particular that changing the value of $\bar{\lambda}$ changes the relative positions of the efficiency curves. The value of $\bar{\lambda}$ denotes the wavelength at which the peak value of the zero order efficiency curve will lie.

The parameters for FIG. 20 are k=2, L=3, and $\bar{\lambda}$=0.5 micrometers.

The parameters for FIG. 21 are k=2, L=3, and $\bar{\lambda}$=0.6 micrometers.

The relative positions of the efficiency curves are controlled by the parameter $\bar{\lambda}$.

FIGS. 22 and 23 are graphs like FIGS. 19–21 but show the effect of altering the parameter k (which is always an integer). These FIGS. 22 and 23 show in particular that as k is increased the efficiency curves are compressed toward $\bar{\lambda}$. Not shown, but also true, is the fact that when k is decreased, the efficiency curves expand around $\bar{\lambda}$. The parameters for FIG. 22 are k=3, L=3, and $\bar{\lambda}$=0.5 micrometers. The parameters for FIG. 23 are k=4, L=3, and $\bar{\lambda}$=0.54 micrometers.

The widths of the efficiency curves are controlled by the parameter k.

FIGS. 24 and 25 are graphs like FIGS. 19–23 but show the effect of altering the parameter L (an integer).

FIGS. 24 and 25 show in particular that only orders whose magnitudes are less than or equal to L/2 ($|m| \leq L/2$) have significant efficiency amplitudes. When L is even, the $\pm L/2$ orders have identical efficiency curves.

The parameters for FIG. 24 are k=2, L=4, and $\bar{\lambda}$=0.54 micrometers.

The parameters for FIG. 25 are k=2, L=5, and $\bar{\lambda}$=0.54 micrometers.

The orders which have significant efficiency amplitudes are controlled by the parameter L.

Before discussing FIGS. 26–28, it is believed a bit of background will be helpful to explain some information which is illustrated in these figures.

Any perceived color can be matched by a combination of three independent colors. These independent colors are referred to as primaries. Most often, the primaries are chosen to be particular shades of red, green, and blue so these primaries are often referred to as RGB primaries.

Since there are many choices of what constitutes a red, green, or blue primary, the color matching curves are dependent on the particular choice of primaries that is made.

The color content of a set of primaries is customarily displayed on a chromaticity diagram.

FIG. 26 is a chromaticity diagram which shows the chromaticities of the spots produced by a color separation microlens designed to give a maximum color gamut with three primaries. The primaries correspond to red, green, and blue colors. Any color which lies within the color gamut (i.e., within the polygon with vertices described by the primaries) can be reproduced for display by appropriately adjusting the amounts of the primaries. The calculation made to design this element assumed that the element was illuminated by an equal energy spectrum (i.e., an equal amount of energy at each wavelength across the visible band). If the spectrum of the illuminating light can be controlled (e.g., by choosing proper phosphors for a fluorescent lamp) then an even larger color gamut can be obtained. Controlling the spectrum of the illuminating light gives a larger design freedom for the color gamut.

This FIG. 26 shows the attainable color gamut for a display which uses three primaries and an equal energy spectrum for the illumination light.

The attainable color gamut is dependent upon the design parameters chosen.

FIG. 27 is a graph like FIG. 26 but showing the chromaticities of the spots produced by an color separation microlens designed to give a maximum color gamut with five primaries. The primaries correspond to red, yellow, green, blue and violet colors.

This FIG. 27 shows the attainable color gamut for a display which uses five primaries and an equal energy spectrum for the illumination light.

The attainable color gamut is dependent upon the design parameters chosen.

The design equation for the color separation microlens is actually the equation that describes the spectral efficiencies for a particular design. The efficiency curve for the mth order is given by the equation $$\eta_m(\lambda) = \left\{ \mathrm{sinc}(m/L) \frac{\sin|L\pi(k\bar{\lambda}/\lambda - m/L)|}{L\sin|\pi(k\bar{\lambda}/\lambda - m/L)|} \right\}^2$$

where m is the diffraction order number, k is the overphasing parameter (always an integer), L is the number of steps in a period of the grating, and $\bar{\lambda}$ is the "design" wavelength. The sinc function is described by $\mathrm{sinc}(x)=\sin(\pi x)/(\pi x)$. Note that k and $\bar{\lambda}$ always appear as a product in the design equation, so in fact $k\bar{\lambda}$ is a single parameter rather than two independent parameters. The reason this parameter is split up into two parameters is that it is much easier to describe the dependencies of the efficiency curves in terms of two separate parameters rather than a combined parameter. $k\bar{\lambda}$ is related to physical parameters through $d=k\bar{\lambda}/(n-1)$ where d is a step height of the grating and n is the index of refraction of the material the color separation microlens is made of. Note that if the material is dispersive (i.e., the refractive index depends on the wavelength) then since d is fixed and k is always an integer, $\bar{\lambda}$ will in general be a function of wavelength.

In brief, the design parameters affect the efficiencies in the following way:

The design wavelength specifies where the peak efficiency of the zero order will fall. The overphasing parameter describes how compressed or expanded the efficiency curves will be. The number of steps controls which orders (those with magnitudes less than or equal to L/2) will have significant energy.

The design equation assumes that the height and width of a step in the grating are constant within a grating period. These assumptions can be relaxed to allow more design freedom by allowing the step heights to be non-uniform and the locations of the step jumps to be arbitrarily located within a grating period. When this is done, better designs can be obtained, but the description of the efficiencies is much more complicated.

Two parameters which are not included in the design equation are the number of grating periods across an element, N, and the focal length of the element, $f$. The efficiencies do depend on N, but when $N \geq 4$, the effect is largely negligible. Since the efficiencies do not depend on $f$, the focal length allows an independent design freedom for specifying the spot sizes and separations.

FIG. 28 is a plot which shows the color matching curves corresponding to a color separation microlens which has the efficiency curves of FIG. 26.

Color matching curves tell how much of each primary is required to simulate a given color in the visible spectrum.

To match a color in the spectrum, we simply read off the values of the red, green and blue curves at the chosen wavelength.

For example, at $\lambda=0.5$ μm, we read off r=−0.29, g=1.12, b=0.18 which means that to produce the sensation of a spectral color of 0.5 μm, we need to combine the primaries in the ratios −0.29:1.12:0.18. Since a negative amount of primary (r=−0.29 in the example) is not physically attainable, what is often done for color display is simply to ignore the negative contribution, or to substitute a color of appropriate hue with high saturation for the desired color.

To match a non-spectral color, the color is broken up into its spectral components, the color matching values for the spectral components are calculated and summed according to the weighting of the spectral components.

Once a set of primaries has been chosen for a display, the color matching curves specify the amounts of the primaries necessary for reproducing any color. In a physical set-up, the color matching curves can be used as a basis for designing a color separation microlens used for color pickup in a CCD camera. If a color separation microlens can be designed whose efficiency curves closely match the shapes of the color matching curves, then the color information from any scene can be obtained by imaging the scene using an array of color separation microlenses.

Matching efficiency curves to color matching curves gives a means of using the color separation microlens to obtain color content from an image.

The color separation microlens described above has a particular utility in a number of applications, including the applications listed in FIG. 3 of the drawings.

The color separation microlens, when arranged in arrays and when associated with other complements (described in more detail below), enables a new flat panel display to be constructed.

The new flat panel display of the present invention makes much more efficient use of light transmitted through the display than was possible with prior art flat panel displays.

The flat panel display of the present invention eliminates color filters, and losses inherent in color filters, and has other unexpected benefits, as will be described in more detail below, over prior art flat panel displays which used color filters.

FIG. 29 shows a flat panel display structure constructed in accordance with typical prior art components and techniques.

A brief review of this FIG. 29 prior art flat panel display will be helpful for comparison to and for a better understanding of the new structural features and new methods of operation of the flat panel display of the present invention.

A flat panel display structure constructed in accordance with conventional prior art techniques is illustrated generally by the reference numeral 70 in FIG. 29.

The flat panel display 70 includes a light tube 72, a diffuser wafer 74, a cover plate 76, and a polarizing wafer 78.

The light transmitted through the polarizing wafer 78 is a single polarized light and is transmitted to a liquid crystal array 80.

The liquid crystal array comprises individual unit cells 82, and each unit cell 82 has three, individually and selectively, controllable liquid crystal elements or sub-pixels 84 mounted within a mask in the unit cell. Only the light striking one or more of the liquid crystal sub-pixels 84 can be transmitted through the unit cell. The rest of the light is blocked by the mask extending about the individual liquid crystal sub-pixels 84.

A color filter wafer 86 is aligned with the liquid crystal array 80 so that each individual liquid crystal sub-pixel 84 in each unit cell 82 of the liquid crystal array has one, and only one, red, green or blue filter 88 aligned with that individual liquid crystal sub-pixel 84.

Thus, for example, if an individual liquid crystal sub-pixel 84 aligned with a blue filter 88 is activated to transmit polarized light through that liquid crystal sub-pixel 84, then blue light will be transmitted through that blue filter 88 in that unit cell of the filter.

If the other two liquid crystal sub-pixels in that particular unit cell are energized not to transmit light through that unit cell, then only blue light will be transmitted through that particular unit cell.

If, however, more than one liquid crystal sub-pixel 84 in a particular unit cell is selected to transmit light, then the color of the light flowing out of the filter 86 for that particular unit cell will have a color which is dependent upon the combination of the respective colors of the filters associated with the light transmitting liquid crystal sub-pixels 84 in that particular unit cell.

A polarizing wafer 90 and a cover glass 92 are also conventional components in the prior art flat panel display 70 shown in FIG. 29.

To obtain colors in a displayed image in accordance with prior art techniques, the prior art flat panel display 70 utilized a liquid crystal structure 80 having an array of unit cells 82 having three independently controlled liquid crystal sub-pixels 84 in each unit cell.

Individual red, green, and blue filters 88 were aligned with respective ones of the individually controlled liquid crystal sub-pixels 84 in the unit cells 82 of the liquid crystal array 80.

By selective energization of a particular liquid crystal element of sub-pixel 84 in a unit cell 82 the amount of light transmitted through that liquid crystal sub-pixel could be modulated. Light which was transmitted through that particular liquid crystal sub-pixel 84 then passed through a related filter 88 of one particular color (red, green, or blue). The light transmitted through a particular liquid crystal sub-pixel and through its associated filter had the color of that particular filter. The overall color of the light ultimately transmitted through a viewable pixel of a particular unit cell was therefore dependent upon which, if any, liquid crystal sub-pixels were energized to transmit light to and through the related red, green and blue filters in the pixel of that particular unit cell.

The overall image displayed by the prior art flat panel display 70 was a composite image made up from the inputs of all of the unit pixel of the cells in the arrays.

This prior art flat panel display was inherently inefficient in terms of the ratio of the brightness of the display to the intensity of the illumination.

There are at least two significant reasons for the inefficiency.

First of all, the only light which could be transmitted through the flat panel display was the light which was permitted to pass through a particular one or ones of the liquid crystal sub-pixels 84 in the various unit cells 82 in the liquid crystal array 80.

All of the light which was not transmitted through selected ones of the liquid crystal sub-pixels 84 was blocked and was lost.

The only light which could be transmitted through the unit cells, in any event, was the light which fell directly on the areas of the individual liquid crystal sub-pixels 84 in a unit cell 82. All of the light falling on areas outside such individual liquid crystal sub-pixels 84 was also blocked and was lost.

Secondly, each color filter 88 caused some reduction in the intensity of the light as the light passed through the filter.

The embodiments of the new flat panel display constructed in accordance with the present invention incorporate an array of color separation microlenses. Each color separation microlens in the array is a single, micro-optical element which disperses color by orders and to distinct color spots and which focuses these spots to related liquid crystal element or sub-pixels located in a common plane.

The spots fall at the locations of different diffraction orders.

The color separation is done by a color separation grating on the color separation microlens and the focusing is done by the refractive lens incorporated in the color separation microlens.

Because the color separation microlens of the present invention separates the incoming spectrum into distinct color spots and focuses these spots to a common plane, substantially all of the spectrum of light incoming to the dispersive microlens can be focused to certain spots; and the liquid crystal sub-pixels in a unit cell train can be located at those spots. Substantially all of the areas of the spots fall directly and only on the liquid crystal sub-pixels. As a result, very little, if any, light energy is lost by falling outside areas occupied by the individual liquid crystal sub-pixels.

Also, because the color separation microlenses in the array of microlenses provide the color separation, no color filter is required in the flat panel display of the present invention.

Eliminating a filter structure eliminates light losses which are incurred when transmitting light through a color filter.

The flat panel display of the present invention makes much more efficient use of light transmitted through the display structure than was possible with prior art flat panel displays.

The new features and modes of operation of the flat panel display of the present invention will now be described in detail with reference to FIGS. 30–40.

Two embodiments of flat panel displays constructed in accordance with the present invention are illustrated in FIGS. 30–40.

One embodiment, indicated generally by the reference numeral 101, is illustrated in FIGS. 30–36.

Another embodiment, indicated generally by the reference numeral 201, is illustrated in FIGS. 37–40.

The preferred embodiment of the flat panel display 101 illustrated in FIGS. 30–35 incorporates the components indicated by the reference characters A, B, C, D, E, F, and G and FIGS. 32 and 33.

The preferred embodiment 101 illustrated in FIG. 32 includes the components B and C (the multiplexing micro-wafer B and the polarization wafer C) which are described in more detail below. It should be noted, however, that the embodiment of the flat panel display 101 can be constructed without the specific components B and C, the only requirement is that single polarization of at least a portion of the collimated light be obtained and that this single polarized light be supplied to the color separation microlens array D. Single polarization of a portion of the collimated light can be obtained by other, prior art polarization apparatus.

The components B and C shown in FIG. 32 are preferred because the components B and C provide single polarization of substantially all of the collimated light entering the component B.

As indicated in the chart of FIG. 33, the component A is a back illuminating light source which supplies collimated light to the back side of the multiplexing micro-wafer B. The multiplexing micro-wafer B comprises an array of individual, cylindrically and vertically extending (as viewed in FIGS. 30 and 34) lens members 103.

Each lens member 103 has a curved back surface 105 extending across the entire width of the lens member and extending as a cylindrical surface down the entire length of the lens member. Each lens member 103 has a curved front surface 107 which extends across half of the width of the lens member 103 and which extends as a cylindrical surface down the entire length of the lens member 103. The effect of the lens surfaces 105 and 107 is to concentrate the light falling on the entire back surface 105 into a planer, longitudinally extending area at the front side of the multiplexing micro-wafer B which has half the width of the back surface 105 of the lens member 103.

These concentrated, longitudinally, vertically extending (as viewed in FIG. 34), rectangular shaped areas of light are then transmitted to a polarization wafer C.

The polarization wafer C has a series of side by side, longitudinally, vertically extending (as viewed in FIG. 34) beam splitters. Each beam splitter receives one incoming beam of light from a related lens surface 107 and splits the incoming beam to produce two beams of light outgoing from the polarization wafer and, in the process, to convert the dual polarized incoming light to single polarized outgoing light.

This beam splitting function is indicated at the far left hand side of the component C in FIG. 32.

The beam splitting and polarization function of each individual beam splitting unit in the polarization wafer thus returns the outgoing light to a continuous band of light having the same width as the band of light entering the back surface 105 of a related lens member 103 so that a single polarized light is distributed evenly to the color separation microlens array D.

The structure and function of particular forms of a polarization wafer C are described in copending application Ser. No. 08/476,318 filed Jun. 7, 1995 by Gal, et al. and entitled Micropolarization Apparatus and assigned to the same assignee as the assignee of this application. This application has now issued as U.S. Pat. No. 5,650,873 on Jul. 22, 1997.

The components D, E, F, and G comprise, as indicated in the FIG. 33, a color separation microlens array D, a liquid crystal wafer E, a polarizer F, and an anamorphic lens array G.

As can be best seen by looking at FIGS. 34 and 35, and also as indicated by the legend in FIG. 30, there is a unit cell train array 109 positioned in front of the polarization wafer C; and the unit cell train array 109 comprises individual unit cell trains 111 arranged in "n" rows and "m" columns (see FIG. 31).

The unit cell train array 109 includes (as indicated in FIG. 33) the color separation microlens array D, the liquid crystal wafer E, the polarizer F and the anamorphic lens array G.

As best shown in FIGS. 35 and 36, each individual unit cell train 111 includes a color separation microlens 53, a substrate 43, a support wafer 113, a liquid crystal unit cell 82, a black dot filled mask 115, and an anamorphic microlens 117.

The cross-sectional area of a unit cell train 111 corresponds to an optical resolution element on the flat panel display. This cross-sectional area is the same size as the color separation microlens 53, the unit cell 82, the black dot mask 115 and the anamorphic lens 117.

Each unit cell 82 contains three, or more, sub-pixels 84.

Liquid crystal elements or sub-pixels 84 are located within the liquid crystal unit cell 82. Each liquid crystal sub-pixel 84 is individually and selectively controlled to modulate the transmission of the separated color from the spot at which the liquid crystal sub-pixel is located.

The black dot filled mask 115 has openings 119 aligned with the liquid crystal sub-pixels 84.

The color separation microlens 53, as described above, separates the incoming spectrum of polarized light into colors by diffraction order and focuses the separated colors on the liquid crystal sub-pixels 84.

The color, or colors, to be transmitted through the unit cell train 111 to the anamorphic microlens 117 are selected by controlled energization of one or more of the liquid crystal sub-pixels 84 in the unit cell.

Thus, one, two or all three of the separated colors (in the embodiment shown in FIG. 36) may be transmitted to the anamorphic microlens 117 for display in the field of view of that microlens.

Three colors are shown in the FIG. 36 embodiment, but the unit cell train can be constructed to utilize more than three colors (by starting with an appropriately constructed color separation microlens 53) as described in more detail above.

The unit cell train 111 shown in FIGS. 35 and 36 works with three separated colors. Three color separation is sufficient for many applications, but the flat panel display of the present invention can readily utilize more separated colors if necessary or if desired.

FIGS. 37–40 illustrate another embodiment of a flat panel display constructed in accordance with the present invention.

The principle differences between the embodiment 201 shown in FIGS. 37–40 and the embodiment 101 shown in FIGS. 30–36 are in the light source A.

As illustrated in FIGS. 37, 39, and 40, the light source A (of the flat panel display 201) comprises a light panel and collimating optics 121.

The light panel and collimating light optics 121, in turn, comprises a wafer 123 and a collimating microlens array 125.

As best shown in FIGS. 37 and 40, the wafer 123 is formed with a series of mirrors 127 and associated light transmitting tubes 129.

The light transmitting tubes 129 conduct light from an illuminating source, and each individual tube 129 directs light onto an associated mirror 127 which reflects the light to an individual condensing microlens 131.

Each microlens 131 collimates the light and directs the collimated light to a related surface portion 105 of a lens member 103.

This light panel and collimating optics structure 121 provides a light source structure having a minimal width. The structure 121 provides an even and uniform distribution of collimated light to the multiplexing micro-wafer B.

The polarization wafer C and the unit cell trains 111 of the flat panel display 201 are the same as for the flat panel display 101 described above.

In the flat panel display embodiments of the present invention, a plurality of the color separation microlens are arranged in an array, and a back illuminating light source is aligned with the color separation microlenses to supply a spectral band of light to the color separation microlenses.

Polarization means are positioned between the back illuminating light source and the color separation microlenses for polarizing all of the light entering the color separation microlenses.

Liquid crystal means are aligned with each of the color separation microlenses with the liquid crystal means positioned on a side of the color separation microlens opposite the polarization means. The liquid crystal means are selectively controllable for modulating the separated colors in the distinct spots produced by the aligned color separation microlenses.

Anamorphic lens means are aligned with the liquid crystal means for displaying the color as modulated by the liquid crystal means.

The array of the color separation microlens and the associated, aligned elements provide a new flat panel display for displaying color images without the need for color filters.

While we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

What is claimed is:

1. A flat panel display for displaying color images and comprising, back illuminating light source means for supplying a collimated spectral band of illuminating light, polarizing means for polarizing at least a portion of the illuminating light to a single polarization, unit cell train array means for receiving the single polarized light from the polarizing means and for providing an array of pixels in the flat panel display, said unit cell train array means comprising a plurality of individual unit cell trains, each individual cell train comprising, (a) a unitary, color separation microlens which separates colors of the spectral band by diffraction orders and which focuses the separated colors in separate, distinct spots in a common plane, (b) a liquid crystal unit cell positioned at said common plane and having a separate liquid crystal element at each said distinct spot of separate color, each said separate liquid crystal element being selectively controllable to modulate the transmission of the separated color from said spot, and (c) a mask for viewing the color or colors transmitted from said spots of separated colors through said separate liquid crystal elements, and wherein the flat panel display displays a color image in the array of elements without the use of color filters.

2. The invention defined in claim 1 wherein an individual unit cell train comprises the mask having individual openings for transmitting the colors from the separate liquid crystal elements.

3. The invention defined in claim 1 wherein the back illuminating light source means includes a light source which generates uncollimated light and collimating means which collimate the light supplied to said polarizing means.

4. A flat panel display for displaying color images and comprising, back illuminating light source means for supplying a collimated spectral band of illuminating light, polarizing means for polarizing at least a portion of the illuminating light to a single polarization, unit cell train array means for receiving the single polarized light from the polarizing means and for providing an array of pixels in the flat panel display, said unit cell train array means comprising a plurality of individual unit cell trains, each individual cell train comprising, (a) a unitary, color separation microlens which separates colors of the spectral band by diffraction orders and which focuses the separated colors in separate, distinct spots in a common plane, (b) a liquid crystal unit cell positioned at said common plane and having a separate liquid crystal element at each said distinct spot of separate color, each said separate liquid crystal element being selectively controllable to modulate the transmission of the separated color from said spot, and (c) a mask for viewing the color or colors transmitted from said spots of separated colors through said separate liquid crystal elements, and wherein the flat panel display displays a color image in the array of elements without the use of color filters and wherein an individual unit cell train includes an anamorphic microlens for displaying the color in the element in a selected field of view.

5. A flat panel display for displaying color images and comprising, back illuminating light source means for supplying a collimated spectral band of illuminating light, polarizing means for polarizing at least a portion of the illuminating light to a single polarization, unit cell train array means for receiving the single polarized light from the polarizing means and for providing an array of pixels in the flat panel display, said unit cell train array means comprising a plurality of individual unit cell trains, each individual cell train comprising, (a) a unitary, color separation microlens which separates colors of the spectral band by diffraction orders and which focuses the separated colors in separate, distinct spots in a common plane, (b) a liquid crystal unit cell positioned at said common plane and having a separate liquid crystal element at each said distinct spot of separate color, each said separate liquid crystal element being selectively controllable to modulate the transmission of the separated color from said spot, and a mask for viewing the color or colors transmitted from said spots of separated colors through said separate liquid crystal elements, and wherein the flat panel display displays a color image in the array of elements without the use of color filters and wherein the polarizing means includes a beam splitter having an inlet for receiving a single beam of unpolarized light and having an outlet for outputting two beams of a single polarized light.

6. The invention defined in claim 5 including a condensing lens at the inlet of the beam splitter for reducing the width of the incoming beam to one half of the combined widths of the two output beams from the beam splitter.

7. A flat panel display for displaying color images and comprising, back illuminating light source means for supplying a collimated spectral band of illuminating light, polarizing means for polarizing at least a portion of the illuminating light to a single polarization, unit cell train array means for receiving the single polarized light from the polarizing means and for providing an array of pixels in the flat panel display, said unit cell train array means comprising a plurality of individual unit cell trains, each individual cell train comprising, (a) a unitary, color separation microlens which separates colors of the spectral band by diffraction orders and which focuses the separated colors in separate, distinct spots in a common plane, (b) a liquid crystal unit cell positioned at said common plane and having a separate liquid crystal element at each said distinct spot of separate color, each said separate liquid crystal element being selectively controllable to modulate the transmission of the separated color from said spot, and (c) a mask for viewing the color or colors transmitted from said spots of separated colors through said separate liquid crystal elements, and wherein the flat panel display displays a color image in the array of elements without the use of color filters and wherein the back illuminating light source means comprises light panel means and collimating optic means and wherein the light panel means comprise a series of mirrors and a series of associated light tubes with each light tube conducting light from an illuminating source to a related mirror and wherein the collimating optics means comprise a plurality of collimating microlenses and wherein each collimating microlens is positioned to receive light reflected from a reflecting mirror and to transmit the reflected light as a collimated light output from the collimating microlens.

8. A flat panel display for displaying color images and comprising,

- a back illuminating light source for supplying a collimated spectral band of illuminating light,

- a polarizer for receiving the collimated illuminating light from the back illuminating light source and for polarizing at least a portion of the illuminating light to a single polarization at an outlet of the polarizer,

- an array of color separation microlenses positioned at the outlet of the polarizer, said array of color separation microlenses comprising a plurality of unitary, color separation microlenses each of which is constructed to separate colors of a spectral band by diffraction orders and to focus the separated colors in separate, distinct spots in a common place,

- a liquid crystal wafer located at said common plane and providing a plurality of unit cells with each unit cell having a separate, liquid crystal element at each said distinct spot of separated color,

- each said separate liquid crystal element being separately controllable to modulate the transmission of the separated color from said spot,

- a mask having separate apertures for viewing the colors transmitted through the unit cells in the liquid crystal array, and

- wherein the flat panel display displays a color image in the array of elements without the use of color filters.

* * * * *